US012743985B2

(12) United States Patent
Kim et al.

(10) Patent No.: US 12,743,985 B2
(45) Date of Patent: Sep. 22, 2026

(54) ELECTRONIC DEVICE FOR CHANGING REFRESH RATE OF DISPLAY

(71) Applicant: Samsung Electronics Co., Ltd., Suwon-si (KR)

(72) Inventors: Kookjin Kim, Suwon-si (KR); Kiljae Kim, Suwon-si (KR); Jaeho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/205,255

(22) Filed: May 12, 2025

(65) Prior Publication Data

US 2025/0273123 A1 Aug. 28, 2025

Related U.S. Application Data

(63) Continuation of application No. PCT/KR2024/004686, filed on Apr. 9, 2024.

(30) Foreign Application Priority Data

Apr. 14, 2023 (KR) ........................ 10-2023-0049309
May 11, 2023 (KR) ........................ 10-2023-0061100

(51) Int. Cl.
*G09G 3/20* (2006.01)
*G06F 11/30* (2006.01)

(52) U.S. Cl.
CPC ....... *G09G 3/2092* (2013.01); *G06F 11/3024* (2013.01); *G06F 11/3058* (2013.01);
(Continued)

(58) Field of Classification Search
CPC .... G06F 1/3203; G06F 1/3206; G06F 1/3228; G06F 1/3234; G06F 1/3243;
(Continued)

(56) References Cited

U.S. PATENT DOCUMENTS 9,058,173 B2 6/2015 Murakami
9,904,612 B2 2/2018 Orakwue et al.
(Continued)

FOREIGN PATENT DOCUMENTS

KR 10-2005-0060450 A 6/2005
KR 10-2006-0077848 A 7/2006
(Continued)

OTHER PUBLICATIONS

International Search Report and written opinion dated Jul. 23, 2024, issued in International Application No. PCT/KR2024/004686.
(Continued)

*Primary Examiner* — Nelson M Rosario
(74) *Attorney, Agent, or Firm* — Jefferson IP Law, LLP

(57) ABSTRACT

Provided is an electronic device comprising a touch-sensitive display, a processor operatively connected to the display and a memory operatively connected to the processor. The memory stores instructions which, when executed, cause the electronic device to display visual information on the display and measure, based on a second measurement period, a utilization rate of the processor, while the visual information is being displayed on the display and the utilization rate of the processor is being measured based on the second measurement period, identify that a particular event related to performance of the processor has occurred, and based on identifying that the particular event has occurred, change a measurement period for measuring the utilization rate of the processor to a first measurement period shorter than the second measurement period.

17 Claims, 12 Drawing Sheets

(52) U.S. Cl.
CPC . *G09G 2340/0435* (2013.01); *G09G 2354/00* (2013.01); *G09G 2360/18* (2013.01); *G09G 2370/10* (2013.01); *G09G 2370/16* (2013.01)

(58) Field of Classification Search
CPC .. G06F 1/3246; G06F 3/0482; G06F 3/04847; G06F 3/0488; G06F 9/48; G06F 9/485; G06F 9/543; H04W 52/0264; H04M 1/72403; Y02D 10/00; Y02D 30/70
See application file for complete search history.

(56) References Cited

U.S. PATENT DOCUMENTS

| | | | | |
|---|---|---|---|---|
| 11,037,477 | B2 | 6/2021 | Choi et al. | |
| 11,094,033 | B2 * | 8/2021 | Vembu | G06T 1/20 |
| 11,322,077 | B1 | 5/2022 | Chun | |
| 11,336,879 | B2 | 5/2022 | Kwon | |
| 11,460,906 | B2 | 10/2022 | Kwon et al. | |
| 11,798,508 | B2 | 10/2023 | Jeong | |
| 11,972,712 | B2 * | 4/2024 | Ranjan | G09G 3/20 |
| 2014/0225817 | A1 | 8/2014 | Huang et al. | |
| 2016/0358303 | A1 | 12/2016 | Juliano | |
| 2021/0026709 | A1 | 1/2021 | Noh et al. | |
| 2021/0247823 | A1 | 8/2021 | Bang et al. | |
| 2021/0255746 | A1 | 8/2021 | Hu et al. | |
| 2021/0389973 | A1 | 12/2021 | Choi et al. | |
| 2023/0016948 | A1 | 1/2023 | Kim et al. | |

FOREIGN PATENT DOCUMENTS

| | | | |
|---|---|---|---|
| KR | 10-1248470 | B1 | 3/2013 |
| KR | 10-2018-0013608 | A | 2/2018 |
| KR | 10-2019-0067981 | A | 6/2019 |
| KR | 10-2021-0142761 | A | 11/2021 |
| KR | 10-2022-0036232 | A | 3/2022 |
| KR | 10-2022-0068777 | A | 5/2022 |
| KR | 10-2022-0116873 | A | 8/2022 |
| KR | 10-2022-0135134 | A | 10/2022 |
| KR | 10-2545078 | B1 | 6/2023 |

OTHER PUBLICATIONS

European Search Report dated Mar. 5, 2025, issued in European Application No. 24717080.6.

European Office Action dated Sep. 29, 2025, issued on European Application No. 24 717 080.6.

* cited by examiner 200
160
DISPLAY
230
DISPLAY DRIVER IC
INTERFACE MODULE
231
MEMORY
233
IMAGE PROCESSING MODULE
235
MAPPING MODULE
237
210
DISPLAY PANEL
176
SENSOR MODULE
250
TOUCH CIRCUIT
251
TOUCH SENSOR
253
TOUCH SENSOR IC ELECTRONIC DEVICE (300)
WIRELESS COMMUNICATION CIRCUIT
310
DISPLAY
FRAME BUFFER
320
325
MEMORY
SURFACE BUFFER
377
388
SENSING CIRCUIT
366
PROCESSOR
399
MEMORY
360
PARTICULAR EVENT-MONITORING MODULE
350
SURFACEFLINGER
340
FRAMEWORK
335
APPLICATION
330
FRAME RATE CONFIGURATION MODULE
341
SYNTHESIS MODULE
343

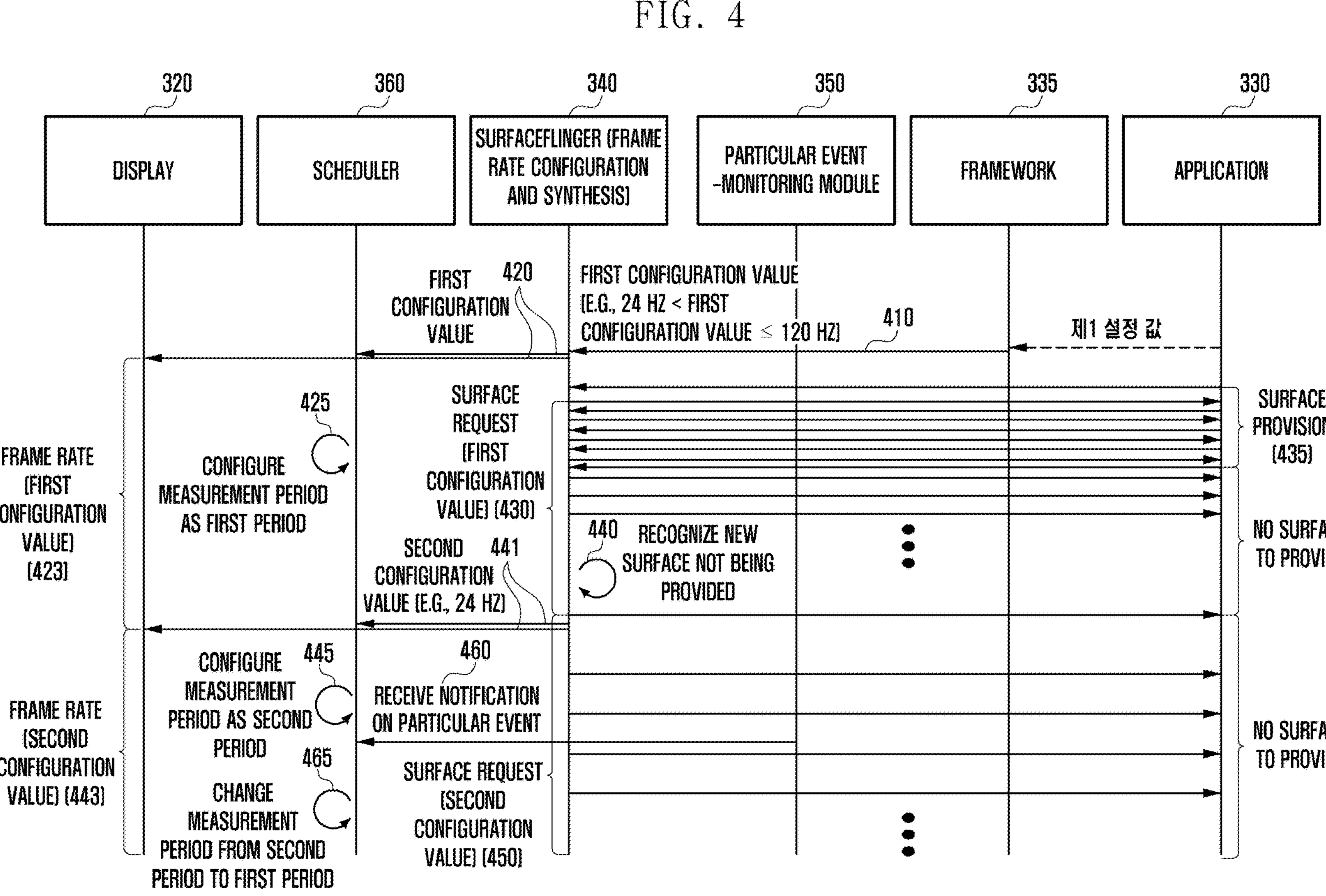

FIG. 4
320
DISPLAY
360
SCHEDULER
340
SURFACEFLINGER (FRAME RATE CONFIGURATION AND SYNTHESIS)
350
PARTICULAR EVENT -MONITORING MODULE
335
FRAMEWORK
330
APPLICATION
FIRST CONFIGURATION VALUE
420
FIRST CONFIGURATION VALUE (E.G., 24 HZ < FIRST CONFIGURATION VALUE ≤ 120 HZ)
410
제1 설정 값
SURFACE PROVISION (435)
425
CONFIGURE MEASUREMENT PERIOD AS FIRST PERIOD
SURFACE REQUEST (FIRST CONFIGURATION VALUE) (430)
FRAME RATE (FIRST CONFIGURATION VALUE) (423)
440
RECOGNIZE NEW SURFACE NOT BEING PROVIDED
NO SURFACE TO PROVIDE
SECOND CONFIGURATION VALUE (E.G., 24 HZ)
441
CONFIGURE MEASUREMENT PERIOD AS SECOND PERIOD
445
460
RECEIVE NOTIFICATION ON PARTICULAR EVENT
FRAME RATE (SECOND CONFIGURATION VALUE) (443)
NO SURFACE TO PROVIDE
465
CHANGE MEASUREMENT PERIOD FROM SECOND PERIOD TO FIRST PERIOD
SURFACE REQUEST (SECOND CONFIGURATION VALUE) (450)

ELECTRONIC DEVICE FOR CHANGING REFRESH RATE OF DISPLAY

CROSS-REFERENCE TO RELATED APPLICATION(S)

This application is a continuation application, claiming priority under 35 U.S.C. § 365(c), of an International Application No. PCT/KR2024/004686, filed on Apr. 9, 2024, which is based on and claims the benefit of a Korean patent application number 10-2023-0049309, filed on Apr. 14, 2023, in the Korean Intellectual Property Office, and of a Korean patent application number 10-2023-0061100, filed on May 11, 2023, in the Korean Intellectual Property Office, the disclosure of each of which is incorporated by reference herein in its entirety.

TECHNICAL FIELD

The disclosure relates to an electronic device configured to change the refresh rate of a display.

BACKGROUND ART

Refresh rate (in other words, frame rate) may be defined as the number (e.g., frame per second (FPS)) of frames displayed on a display per unit time. An electronic device (e.g., smartphone) may be configured to change a frame rate.

The electronic device may make efficient use of the power of a battery by means of a variable refresh rate (VRR). For example, a processor (e.g., application processor) of the electronic device may synthesize, into one frame, images (e.g., surfaces) as a source to be drawn on the screen, and provide the one frame to a display. When there is no frame to provide to the display, the processor may lower the frame rate to a designated minimum value, thereby suppressing the waste of power. The frame rate may be differently designated according to the type of an application being executed in the electronic device. For example, the electronic device may configure a relatively low frame rate when running an application supporting video reproduction, compared to an application supporting a game.

The information described above is provided as a related art for helping understanding of the disclosure. No assertion or determination is made as to whether any of the contents described above could be applied as prior art in relation to the disclosure.

DISCLOSURE OF INVENTION

Technical Problem

An electronic device may configure an operation speed of a processor to be synchronized with a frame rate. For example, the electronic device configures a lower operation speed (e.g., clock frequency) for the processor according to the frame rate being lowered, so as to more efficiently use the power of a battery. This may reduce the rate of battery power consumption.

An event requiring quick processing of work may occur in the electronic device. When such an event occurs, in a case where a low frame rate is configured and the operation speed of the processor is synchronized with the frame rate, work may be slowly processed in the processor due to the performance of the processor below a required level.

An electronic device according to various embodiments of the disclosure may quickly process required work by temporarily releasing synchronization at the time of occurrence of an event requiring quick processing of work, in a state where a low frame rate is configured and the operation speed of the processor is synchronized with the frame rate. The technical task to be achieved by the disclosure is not limited to that mentioned above, and other technical tasks that are not mentioned above may be clearly understood to a person having common knowledge in the technical field to which the disclosure belongs based on the description provided below.

Solution to Problem

According to an embodiment, an electronic device includes a touch-sensitive display, a processor operatively connected to the display, and memory operatively connected to the processor. The memory may store instructions which, when executed by the processor, cause the electronic device to display visual information on the display, based on a first refresh period and measure a utilization rate of the processor, based on a first measurement period. The instructions may cause the processor to, in case that there is no change of the visual information of the display for a given time, display the visual information on the display, based on a second refresh period longer than the first refresh period, and measure the utilization rate of the processor, based on a second measurement period longer than the first measurement period. The instructions may cause the processor to, while the visual information is being displayed on the display, based on the second refresh period and the utilization rate of the processor is being measured based on the second measurement period, in case that a particular event related to performance of the processor has occurred in the electronic device, measure the utilization rate of the processor, based on the first measurement period.

A method of operating an electronic device according to an embodiment may include displaying visual information on a display of the electronic device, based on a first refresh period and measuring a utilization rate of a processor in the electronic device, based on a first measurement period. The method may include, in case that there is no change of the visual information of the display for a given time, displaying the visual information on the display, based on a second refresh period longer than the first refresh period, and measuring the utilization rate of the processor, based on a second measurement period longer than the first measurement period. The method may include, while the visual information is being displayed on the display, based on the second refresh period and the utilization rate of the processor is being measured based on the second measurement period, in case that a particular event related to performance of the processor has occurred in the electronic device, measuring the utilization rate of the processor, based on the first measurement period.

According to an embodiment, a recording medium for storing instructions readable by a processor of an electronic device is provided. When executed by the processor, the instructions may cause the electronic device to display visual information on a display of the electronic device, based on a first refresh period and measure a utilization rate of the processor, based on a first measurement period. The instructions may cause the processor to, in case that there is no change of the visual information of the display for a given time, display the visual information on the display, based on a second refresh period longer than the first refresh period, and measure the utilization rate of the processor, based on a second measurement period longer than the first measurement period. The instructions may cause the processor to, while the visual information is being displayed on the display, based on the second refresh period and the utilization rate of the processor is being measured based on the second measurement period, in case that a particular event related to performance of the processor has occurred in the electronic device, measure the utilization rate of the processor, based on the first measurement period.

Advantageous Effects of Invention

An embodiment of the disclosure may provide an electronic device which is able to quickly process required work by temporarily releasing synchronization at the time of occurrence of an event requiring quick processing of work, in a state where a low frame rate is configured and the operation speed of the processor is synchronized with the frame rate. Various other effects identified directly or indirectly through this document may be provided.

BRIEF DESCRIPTION OF DRAWINGS

FIG. 4 is a flowchart illustrating operations for configuring a frame rate of a display and a measurement period of a processor in an electronic device according to an embodiment;

Figure 1:
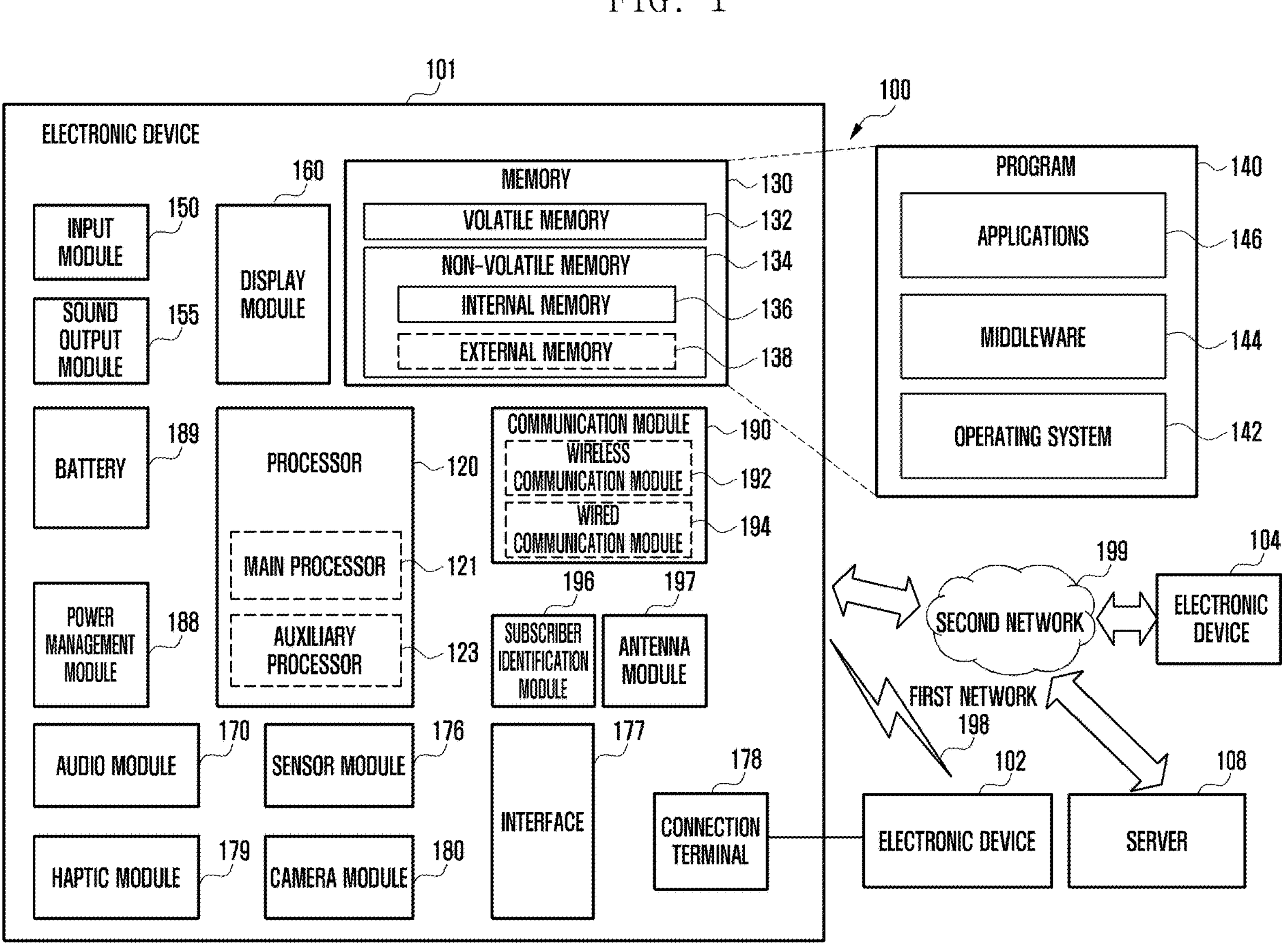
FIG. 1 is a block diagram of an electronic device in a network environment according to various embodiments.

Hereinafter, embodiments of the disclosure will be described in detail with reference to the drawings so that a person having common knowledge in the technical field to which the disclosure belongs are able to readily carry out the disclosure. However, the disclosure may be implemented in any of various forms, and should not be construed as being limited to the embodiments set forth herein. In relation to the description of drawings, the same or similar elements may be indicated by the same or similar reference signs. In addition, in the drawings and related descriptions, description of well-known functions and configurations may be omitted for clarity and briefness.

MODE FOR THE INVENTION

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
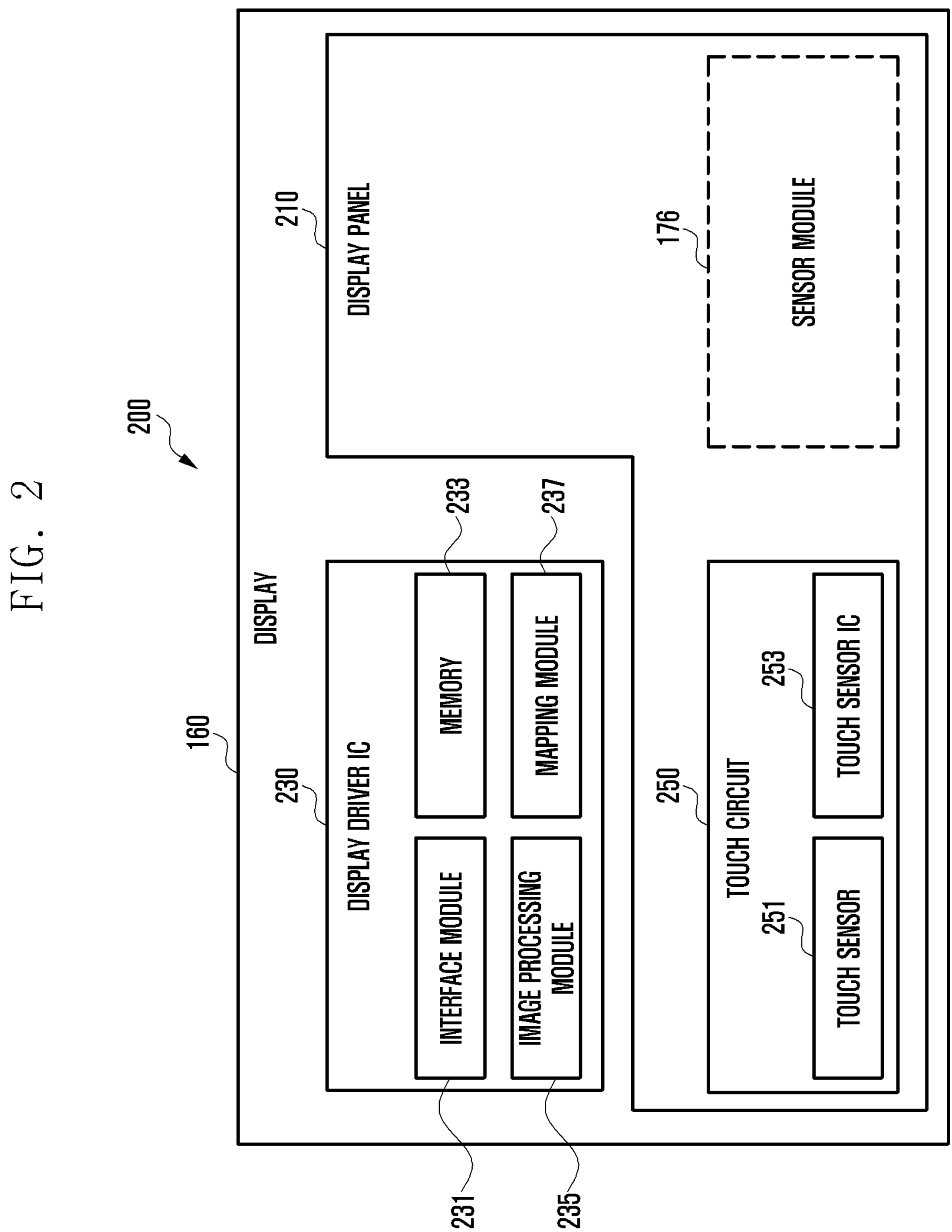
FIG. 2 is a block diagram of a display according to various embodiments.

FIG. 2 is a block diagram 200 illustrating the display module 160 according to various embodiments.

Referring to FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

A display indicated by reference numeral 160 in FIG. 1 and FIG. 2 may be replaced with the term "display module" or "display circuit".

A bar-type housing structure may be applied to an electronic device (e.g., smartphone or tablet PC) 101. For example, the bar-type housing structure may include a plate (or cover) forming a front surface of the electronic device 101, a plate forming a rear surface of the electronic device 101, and a bezel structure forming a lateral surface surrounding the front surface and the rear surface. A display may be disposed on the front surface.

A foldable housing structure may be applied to the electronic device (e.g., smartphone, tablet PC, or notebook PC) 101. For example, the electronic device 101 may have a foldable housing structure divided into two housings around a folding axis. A first display area of a display (e.g., a flexible display) may be disposed on a first housing, and a second display area of the display may be disposed on a second housing. The foldable housing structure may be implemented in an in-folding type in which the first display area and the second display area face each other when the electronic device 101 is in a folded state. Alternatively, the foldable housing structure may be implemented in an out-folding type in which the first display area and the second display area face opposite directions when the electronic device 101 is in a folded state. In another example, the first display area and the second display area may be display areas of separate displays, such as a first display and a second display.

A slidable (or rollable) housing structure may be applied to the electronic device (e.g., smartphone, tablet PC, or notebook PC) 101. The electronic device 101 may include a slidable housing including a housing (or a first housing) and a slider (or a second housing), a rail structure enabling the slider to be introduced into the housing and ejected from the housing (e.g., a rail structure by gear-coupling between a rack gear and a pinion gear), and a rollable display (e.g., flexible display). The slider may be divided into a part (hereinafter, an introduction part) being able to enter into the housing, and a part being maintained to be exposed to the outside. In a slide-out state (in other words, a first state, an open state, an extended state, and a roll-out state) in which the introduction part of the slider has all been ejected from the housing, the entire display (or most of the display area) may be exposed to the outside through the front surface. When the introduction part of the slider is introduced into the housing, the display may also be introduced into the housing. The display may also be divided into a part (e.g., a first display area or a first section) being maintained to be exposed to the outside, and a part (e.g., a second display area, a second section, or a bendable section) being able to enter into the housing. At the time of state switching to a slide-in state (in other words, a second state, a closed state, a reduced state, and a roll-in state) in which the entirety of the introduction part of the slider has been introduced in the housing, the entirety of the second display area of the display may be introduced into the housing. In an embodiment, at the time of state switching from the slide-out state to the slide-in state, a part (e.g., the second display area) of the display may be moved to the rear surface along the lateral surface rather than being introduced into the housing. As described in the above example, the electronic device 101 may have a sliding structure in which a part of the display is introduced into the housing, or a sliding structure in which a part of the display is moved from the front surface to the rear surface. Only a part of the display exposed through the front surface may be determined as a display area (hereinafter, activated area) activated to display visual information. A part introduced into the housing or moved to the rear surface may be determined as a deactivated area in which visual information is not displayed.

Figure 3:
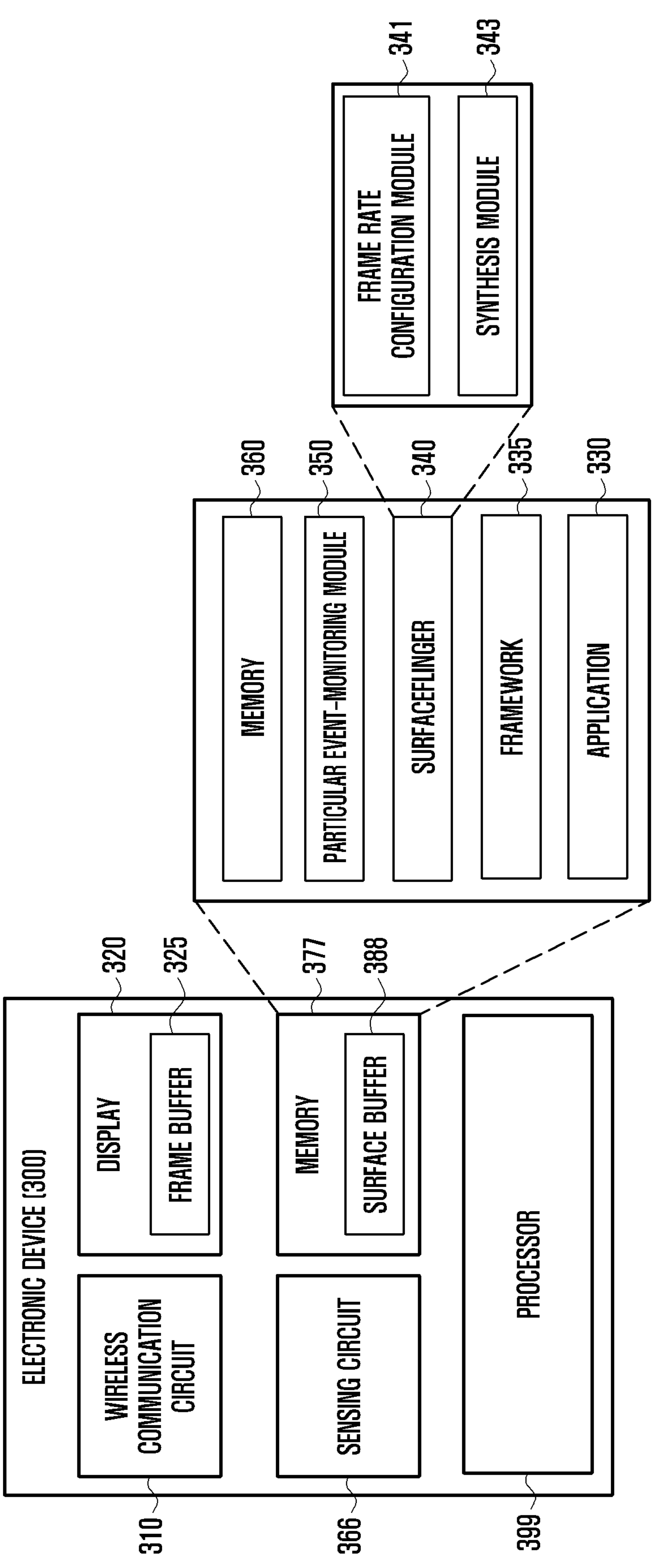
FIG. 3 is a block diagram of an electronic device configured to configure a frame rate and perform CPU scheduling according to an embodiment.

FIG. 3 is a block diagram of an electronic device 300 configured to configure a frame rate and perform CPU scheduling according to an embodiment.

Referring to FIG. 3, the electronic device 300 (e.g., the electronic device 101 in FIG. 1) may include a wireless communication circuit 310, a touch-sensitive display 320, an application 330, a framework 335, a surfaceflinger 340, a particular event-monitoring module 350, a scheduler 360, a sensing circuit 366, a memory 377, and/or a processor 399. The wireless communication circuit 310, the display 320, the sensing circuit 366, the memory 377, and the processor 399 may be implemented to be substantially identical to the wireless communication module 192, the display 160, the sensor module 176, the memory 130, and the processor 120 in FIG. 1, so as to perform the same functions, respectively. The application 330, the framework 335, the surfaceflinger 340, the particular event-monitoring module 350, and the scheduler 360 are software and may be stored in the memory 377 (e.g., the memory 130 in FIG. 1) and be executed by the processor 399. The surfaceflinger 340 may be configured to manage image synthesis and control the frame rate of the display 320. According to an embodiment, the surfaceflinger 340 may include a frame rate configuration module 341 and a synthesis module 343. It will be appreciated that operations of the surfaceflinger 340 may, more generally, be regarded as operations of the processor 399 or of the electronic device 300.

The application 330 may create images (in other words, surfaces) to be displayed on the display 320, and store same in the surface buffer 388 or, more generally, in the memory 377. The surface buffer 388 may be a memory area allocated for surface storage in the memory 377. For example, the processor 399 may be configured to allocate a part of a volatile memory in the memory 377 to the surface buffer 388, as a buffer (e.g., BufferQueue) for storing images generated by the application 330. The application 330 may create an image by using a graphics engine (e.g., skia or GLES), and store same in the surface buffer 388. For example, the application 330 may generate, as elements configuring a home screen, a status bar, a background, widgets, and a navigation bar. The application 330 may store the above elements of the home screen in the surface buffer 388.

The framework 335 (e.g., the middleware 144 in FIG. 1 or FIG. 2) may provide various functions to the application 330 so that a function or information provided from resources of the electronic device 300 is usable by the application 330. For example, the application 330 may call, from the framework 335, an application programming interface (API) for connection between the frame rate configuration module 341 and the application 330. The application 330 may determine the frame rate of the display 320 and may provide a configuration value corresponding to the determined frame rate to the frame rate configuration module 341 via the called API.

The frame rate configuration module 341 may receive a value for configuring a frame rate from the application 330 or the framework 335. The frame rate configuration module 341 may transfer a received configuration value to the display 320. The display 320 may configure a frame rate as the received value. It will be appreciated that, in some examples, the display 320 may receive a configuration value from the application 330 or the framework 335.

The frame rate configuration module 341 may be configured to request the display 320 to change the frame rate, based on occurrence of, in the electronic device 300, an event requiring change in the frame rate.

For example, the frame rate configuration module 341 receives a touch input for interacting with the application 330 from the display 320 in a state where the frame rate of the display 320 is configured as a second configuration value (e.g., a minimum value or a low value). The frame rate configuration module 341 recognizes the received touch input as a change-requiring event described above, and based on the recognition, determines the frame rate as a first configuration value larger than the second configuration value. The frame rate configuration module 341 transfers the first configuration value to the display 320, thereby allowing the display 320 to raise the frame rate to the first configuration value. Additionally or alternatively, the frame rate configuration module 341 recognizes, as a change-requiring event described above, a touch input not being received for a given time in a state where the frame rate is configured as the first configuration value, and based on the recognition, determines the frame rate as the second configuration value. The frame rate configuration module 341 transfers the second configuration value to the display 320, thereby allowing the display 320 to lower the frame rate to the second configuration value.

As another example, the frame rate configuration module 341 identifies that a surface in the surface buffer 388 has not been updated for a designated time (in other words, a new surface has not been generated by the application 330 for the designated time), in a state where the frame rate is configured as a first configuration value larger than a designated second configuration value (e.g., minimum value or low value). The frame rate configuration module 341, based on the identification, determines the frame rate as the second configuration value. The frame rate configuration module 341 transfers the second configuration value to the display 320, thereby allowing the display 320 to lower the frame rate to the second configuration value.

The synthesis module 343 may periodically transmit a surface request message (e.g., vertical synchronization (VSYNC) signal) to the application 330. The synthesis module 343 may synchronize a transmission period of a surface request message with a frame rate configured by the frame rate configuration module 341. For example, in a case where the frame rate is configured to be 60 Hz, the synthesis module 343 transmits a surface request message to the application 330 every about 16.6 ms (1/60 Hz).

The synthesis module 343 may be configured to synthesize, into one frame, images received from the application 330 via the surface buffer 388. Here, synthesizing may be expressed as rendering, or combining, arranging, configuring etc. For example, the synthesis module 343 designates (e.g., set, mark, indicate, or identify etc.) a layer for images required to be synthesized, and designates (e.g., set, mark, indicate, or identify etc.) a display position on each layer. Here, a layer may be defined as a priority of display for interaction between a user and the electronic device 300. That is, a layer may be assigned a priority (and different layers may be assigned different priorities) according to which the layers are displayed, such as in relation to other layers, and the assignation of priority may reflect interaction between the user and the electronic device, for example by assigning a high priority to a layer to be viewed or interacted with by the user. For example, visual information designated as a first layer has a priority of display higher than that of visual information designated as a second layer. Therefore, a part of visual information designated as the second layer is hidden by visual information designated as the first layer.

In addition, or alternatively, the entirety of visual information designated as the second layer may not be displayed on the display 320 by visual information designated as the first layer, e.g., due to being hidden by the visual information designated as the first layer or due to preference of the visual information designated as the first layer. For example, the synthesis module 343 designates a background as the second layer (or lower layer), and designates a status bar, a widget, and a navigation bar as the first layer (or higher layer). The synthesis module 343 designates the display position of the widget on the first layer to be the center of the screen, designates the display position of the status bar on the first layer to be an upper end of the screen deviating from the center thereof, and designates the display position of the navigation bar on the first layer to be a lower end of the screen deviating from the center thereof. The synthesis module 343 designates the display position of the background on the second layer to be the center of the screen. In addition, the synthesis module 343 configures, as an area to display the background, the entirety of an activated area configured to display visual information on the display 320. Based on the designation, the synthesis module 343 synthesizes, into one frame, a surface (the status bar, the widget, and the navigation bar) designated as an image to be displayed on the first layer, and a surface (the background) designated as an image to be displayed on the second layer, and write the synthesized frame in the frame buffer 325 of the display 320.

The synthesis module 343 may synthesize surfaces according to a synchronization signal generated by the display 320, and transfer a frame, which is a result of the synthesis, to the display 320. For example, the display 320 may configure (e.g., determine, set, identify etc.) the frequency of a synchronization signal, based on a configuration value received from the frame rate configuration module 341. The display 320 may generate a synchronization signal according to a configured frequency. Here, a synchronization signal may be defined as a signal or pulse in which a high voltage level (or ON state) and a low voltage level (or OFF state) are periodically repeated. For example, when a received value is 60 (Hz), a generation period of a synchronization signal (e.g., a period between instances of generating the synchronization signal, a period between high voltage levels in the synchronization signal, or a period between low voltage levels in the synchronization signal) may be 16.6 ms (1/60 Hz). The synthesis module 343 may start synthesizing in a time period in which a synchronization signal has a high voltage level, and complete synthesizing within the generation period. The synthesis module 343 may start frame transmission (an operation of transmitting a frame, which is a result of synthesis, to the display 320) in a next time period in which the synchronization signal has a high voltage level.

The display 320 may refresh a screen according to a frame rate configured by the frame rate configuration module 341. For example, the display 320 (e.g., DDI) receives, from the synthesis module 343, a frame every period corresponding to a frame rate, and writes the received frame in the frame buffer 325. For example, the display 320 starts an operation of writing a frame in the frame buffer 325, in a time period in which a synchronization signal has a high voltage level. The frame buffer 325 is a storage for storing a frame required to be displayed on the display 320, and for example, a memory (e.g., a memory in a display driver IC (DDI)) (e.g., the memory 233 in FIG. 2) embedded in the display 320 may be allocated as the frame buffer 325. The display 320 (e.g., display panel) may scan the frame buffer 325 every period corresponding to a frame rate to obtain and display a frame. For example, the display 320 obtains and display a frame by starting to scan the frame buffer 325 at a time point at which a synchronization signal is changed from a high voltage level to a low voltage level.

The processor 399 may include an application processor. Additionally, the processor 399 may further include at least one of a graphic processing unit (GPU), a communication processor, and an artificial intelligence processor specified to processing of an artificial intelligence model. Each processor may include multiple cores (in other words, central processing units (CPUs)). A process may be defined as a program that is stored in a volatile memory in the memory 377 and is being executed by the electronic device 300 (e.g., the processor 399) or is waiting to be executed. Processes may be classified as a background process and a foreground process (or top-layer process or non-background process). For example, a process that is displayed on the display 320 and thus corresponds to an application execution screen capable of interacting with a user is classified as a foreground process, and/or a process that is hierarchically located under a foreground process and is thus not displayed on the display 320 is classified as a background process.

There is now provided a description of various embodiments in which monitoring is performed by the particular event-monitoring module 350, such as monitoring for a particular event has occurred or monitoring of a parameter or state relating to CPU(s). It will be appreciated that the present disclosure includes all combinations of these various embodiments as well as each embodiment separately. For example, the particular event-monitoring module 350 may monitor for occurrence of a particular event according to one of the following embodiments and may monitoring a state(s) of CPUs according to another one of the following embodiments, and may notify the scheduler 360 if a condition according to the particular event or a condition according to the state(s) of the CPUs is met.

According to an embodiment, the particular event-monitoring module 350 may monitor whether a particular event (in other words, heavy scenario, or heavy-usage scenario) requiring the processor 399 to exhibit high performance occurs in the electronic device 300 in a state where a frame rate is configured to be equal to or smaller than a designated threshold (e.g., a second configuration value). The particular event-monitoring module 350 may notify the scheduler 360 that a particular event (e.g., CPU heavy hint, top-app heavy hint, input/output (I/O) heavy hint, or network heavy hint) has occurred in a state where a frame rate is configured to be equal to or smaller than the designated threshold. In an example, more generally, the particular event-monitoring module 350 detects or identifies a condition being met in a state where a frame rate is configured to be equal to or smaller than the designated threshold, and notifies the scheduler 360 that the condition is met in the state.

According to an embodiment, the particular event-monitoring module 350 may monitor (e.g. detect, identify, determine or view) a utilization rate (utilization, e.g. an amount indicating a usage or load) of all CPUs in the processor 399. For example, the particular event-monitoring module 350 may start to monitor an all-CPU utilization rate, based on execution of a process for measuring CPU performance. The particular event-monitoring module 350 may recognize (e.g., detect, identify, determine etc.), as a CPU heavy hint (e.g., an indication that a CPU is under heavy load or has a high usage), a monitored case in which the utilization rate has a value larger than or equal to a designated threshold (e.g., a configured or predetermined threshold) and/or a time for which the utilization rate is maintained to have a value larger than or equal to the threshold is longer than or equal to a designated threshold time (e.g., a configured or predetermined time), and may notify the scheduler 360 of the recognition.

According to an embodiment, the particular event-monitoring module 350 may monitor the utilization rate (e.g., the utilization rate of all CPUs configuring the processor 399) of the processor 399 on main threads in a foreground process (e.g., a process for editing a video). Threads of a foreground process may be classified as a main thread designated as a subject required or intended to be preferentially executed, and a secondary thread (in other words, a background thread) designated as a subject allowed to be executed relatively later or with lower priority. For example, the main thread may include a thread for image synthesis or a thread for event processing. The background thread is a thread independent of display, and may include, for example, program installation, downloading, music reproduction, video encoding, video decoding, or file transmission. An event may include, for example, a user input generated in an input device (e.g., a touch input received by the processor 399 from the display 320) or an event generated in a corresponding application (e.g., an event to transmit data outside the electronic device 300, or an event to switch a screen to be displayed on the display 320). The particular event-monitoring module 350 may recognize, as an example of a top-app heavy hint (e.g., where a top-app may correspond to a foreground process or main thread(s)), a monitored case in which a load of the processor 399 on main threads has a value larger than or equal to a designated threshold (e.g., a configured or predetermined threshold) and/or a time for which the load is maintained to have a value larger than or equal to the threshold is longer than or equal to a designated threshold time (e.g., a configured or predetermined time), and notify the scheduler 360 of the recognition.

According to an embodiment, the particular event-monitoring module 350 may monitor the number of secondary threads in a foreground process. The particular event-monitoring module 350 may recognize, as another example of a top-app heavy hint, a monitored case in which the utilization rate of the processor 399 against (e.g. used for, or in relation to) the number of secondary threads has a value larger than or equal to a designated threshold and/or a time for which the utilization rate is maintained to have a value larger than or equal to the threshold is longer than or equal to a designated threshold time, and notify the scheduler 360 of the recognition.

According to an embodiment, the particular event-monitoring module 350 may monitor a time (e.g., I/O burst) for which the processor 399 is waiting to input data to the memory 377 or output data from the memory 377 while executing a given process. The particular event-monitoring module 350 may recognize, as an I/O heavy hint, a monitored case in which a waiting time has a value larger than or equal to a designated threshold, and notify the scheduler 360 of the recognition.

According to an embodiment, the particular event-monitoring module 350 may monitor the amount of data packets per unit time transmitted to or received from outside of the electronic device 300 via the wireless communication circuit 310. The particular event-monitoring module 350 may notify the scheduler 360 that a network heavy hint has occurred, based on a monitored case in which the amount of data packets per unit time has a value larger than or equal to a designated threshold and/or a time for which the amount is maintained to have a value larger than or equal to the threshold is longer than or equal to a designated threshold time.

According to an embodiment, the particular event-monitoring module 350 may recognize execution of a particular process as a particular event, and notify the scheduler 360 of the recognition. Here, the particular process may include a process (e.g., media transcoding application) for editing a video or a CPU benchmark (e.g., Geekbench5) for measuring CPU performance.

According to an embodiment, the particular event-monitoring module 350 may recognize, as a particular event, expansion of an activated area of the display 320 in which visual information is to be displayed, and notify the scheduler 360 of the recognition. For example, a foldable housing structure or a slidable housing structure described above may be applied to the electronic device 300. The particular event-monitoring module 350 may recognize, as a particular event, expansion of an activated area from a part of the screen of the display 320 to the entirety thereof by a state change of a housing structure (e.g., the unfolding of a foldable type device such that first and second display area, such as described above, are arranged to face in substantially the same direction; or the unrolling of a rollable type device such that the part being able to enter into the housing, such as a second display area or second section as descried above, is at least partially removed from the housing).

The scheduler 360 may manage an operation of the processor 399 and allocate computer resources to each process to be executable. For example, the scheduler 360 may assign, to a background process, a CPU having relatively small power consumption among CPUs. For example, in a processor called "advanced reduced instruction set computer (RISC) machine (ARM) big.LITTLE", cores may be classified as a low-performance core (little core) and a high-performance core (big core). The scheduler 360 may assign a little core to a background process. The scheduler 360 may assign a little core or a big core to a foreground process.

According to an embodiment, the scheduler 360 may configure a measurement period (in other words, window size, or a size of a window for measurements) of the processor 399 so that a frame rate configured by the frame rate configuration module 341 and the measurement period have a correlation. The correlation between two variables (frame rate and measurement period) may be a positive correlation or a negative correlation. The scheduler 360 may configure a measurement period so that a frame rate and the measurement period have a negative correlation. A negative correlation may be defined as a relation between two variables in which, as one variable (e.g. frame rate) increases, the other variable (e.g. measurement period) decreases, and as the one variable decreases, the other variable increases. For example, in a case where a frame rate is configured as a second configuration value (e.g., 24 Hz), the scheduler 360 may designate a second period (e.g., 16 ms) as a measurement period. In a case where a frame rate is configured as a first configuration value (e.g., 120 Hz), the scheduler 360 may designate a first period (e.g., 4 ms) shorter than the second period as a measurement period. The processor 399 may measure the utilization rate of the processor 399 every measurement period designated by the scheduler 360, and determine an operating frequency (or operating characteristic), based on a result of the measurement. Here, the operating frequency is a factor for determining the number of tasks processible by the processor 399 per unit time and, for example, may be understood as being related to a clock frequency. A task (in other words, thread) is defined as one work unit of a process required to be executed, and the processor 399 may sequentially or simultaneously execute one or multiple tasks, thereby executing one process corresponding thereto. As a measurement period becomes shorter, the processor 399 may relatively quickly identify how much a load is. As the load increases, the processor 399 may configure a relatively high operating frequency; e.g., the processor 399 may increase the operating frequency as the load is detected, or otherwise recognized, to increase. The larger the operating frequency is, the relatively shorter the time taken for the processor 399 to execute a process is.

According to an embodiment, the scheduler 360 may identify, by means of the frame rate configuration module 341, configuration of a frame rate to be equal to or smaller than a designated threshold (e.g., a second configuration value), and based on the identification, configure the measurement period of the processor 399 as a second period (e.g., 16 ms). The scheduler 360 may configure the measurement period of the processor 399 as a first period (e.g., 4 ms), shorter than the second period, based on a particular event, such as described above in various embodiments, having occurred in the electronic device 300 while a frame rate is configured to be smaller than or equal to the designated threshold and the measurement period of the processor 399 is configured as the second period (or longer than the first period).

According to an embodiment, the scheduler 360 may allocate a thread related to the display 320 to a CPU (e.g., little core) consuming low power, and allocate a thread related to the particular event to a CPU (e.g., big core) consuming relatively larger power. For example, a thread related to a particular event known to, or assumed to, correspond to heavy load is allocated to a CPU configured to consume relatively larger power.

According to an embodiment, the scheduler 360 may change the measurement period of the processor 399 from the first period to the second period, based on termination of a process (or thread) related to the particular event while a frame rate is configured to be smaller than or equal to the threshold. For example, the scheduler 360 may configure the measurement period of the processor 399 as a second period (e.g., 16 ms), longer than the first period, based on a particular event or related process (or thread), such as described above in various embodiments, having finished in the electronic device 300 while the measurement period of the processor 399 is configured as the first period (or shorter than the second period).

The sensing circuit 366 is disposed inside the electronic device 300 (e.g., disposed near the battery 189), and may generate data used for identifying the internal temperature of the electronic device 300 and provide the generated data to the processor 399. For example, the sensing circuit 366 may include a temperature sensor configured to detect an internal temperature, generate data corresponding to the detected temperature, and provide same to the processor 399. As another example, the processor 399 may request and obtain temperature data from the sensing circuit 366 periodically (polling manner) or in an interruption manner. According to increment of the internal temperature, the internal resistance of an electric circuit configured in the electronic device 300 may increase linearly. For example, the electronic device 300 may include a power management circuit (e.g., power management integrated circuit (PMIC)) configured to supply power to loads (e.g., a processor, a display, or a camera) configured in the electronic device 300, and adjust the level of voltage or current of power to be supplied. According to increment of the internal temperature, the internal resistance of a lumped element (e.g., inductor) in the power management circuit increases, and this increase in the internal resistance may cause increment of the potential difference (voltage) between both ends of the lumped element. As another example, the sensing circuit 366 may be configured to measure the voltage between both ends of the electric circuit, generate data corresponding to the voltage, and provide same to the processor 399. The processor 399 may determine the internal temperature of the electronic device 300, based on data indicating a voltage received from the sensing circuit 366.

According to an embodiment, the scheduler 360 may recognize, by means of the particular event-monitoring module 350, that a particular event described above has occurred in the electronic device 300, while a frame rate is configured to be equal to or smaller than a designated threshold (e.g., a second configuration value) and the measurement period of the processor 399 is configured as a second period (e.g., 16 ms). Based on the recognition, the scheduler 360 may identify the internal temperature of the electronic device 300 by means of the sensing circuit 366. When the identified internal temperature is lower than a designated temperature value, the scheduler 360 may configure the measurement period of the processor 399 as a first period (e.g., 4 ms) shorter than the second period, based on the occurrence of the particular event. When the identified internal temperature is the designated temperature value or higher, the scheduler 360 may maintain the measurement period of the processor 399 at the second period so as to suppress increment of the internal temperature. In other words, an operation of reducing the measurement period from the second period to the first period and/or an operation of increasing the operating frequency is performed based on the identified internal temperature being lower than a designated, or threshold, temperature value.

According to an embodiment, the scheduler 360 may recognize, by means of the particular event-monitoring module 350, that a particular event described above has occurred in the electronic device 300, while a frame rate is configured to be equal to or smaller than a designated threshold (e.g., a second configuration value) and the measurement period of the processor 399 is configured as a second period (e.g., 16 ms). Based on the recognition, the scheduler 360 may identify a state of charge (SOC) of a battery numerically expressed as a percentage (%) (or a remaining battery charge), by means of the power management circuit (e.g., the power management module 188 in FIG. 1). When the identified state of charge is equal to or larger than a designated percentage (e.g., about 5-15%), the scheduler 360 may configure the measurement period of the processor 399 as a first period (e.g., 4 ms) shorter than the second period, based on the occurrence of the particular event. When the identified state of charge is smaller than the designated percentage, the scheduler 360 may maintain the measurement period of the processor 399 at the second period so as to save power. In other words, an operation of reducing the measurement period from the second period to the first period and/or an operation of increasing the operating frequency is performed based on the amount of charge remaining in the battery of the electronic device 300 being equal to or larger than a designated or threshold percentage (e.g., a designated amount of charge).

In describing operations performed by elements of the electronic device 300 below, the same content as a part described with reference to FIG. 3 will be omitted or briefly described.

FIG. 4 is a flowchart illustrating operations for configuring a frame rate of the display 320 and a measurement period of the processor 399 in the electronic device 300 according to an embodiment.

It will be understood that, according to various embodiments, one or more operations disclosed in FIG. 4 may be omitted or may be re-ordered, where appropriate. Additionally, one or more of the entities shown in FIG. 4 (e.g., application 330, framework 335, particular event-monitoring module 350, surfaceflinger 340, scheduler 360 or display 320) may be considered in combination (e.g., combined) such that explicit signaling (e.g., the transmitting and/or receiving of information/data) between said entities does not need to be considered.

In operation 410, the surfaceflinger 340 may receive, from the framework 335, a first configuration value (e.g., 24 Hz<the first configuration value≤120 Hz) for configuring a frame rate. For example, in a case where the application 330 is a game application, a maximum value of 120 Hz may be transferred from the framework 335 to the surfaceflinger 340. In a case where the application 330 is a home application configured to provide basic user interface (UI) elements (e.g., a status bar, a task bar, a navigation bar, and a home screen) for interacting between a user and the electronic device 300, or a media player configured to support streaming of a video via the wireless communication circuit 310, a value smaller than the maximum value of 120 Hz and larger than a minimum value of 24 Hz may be transferred from the framework 335 to the surfaceflinger 340. According to an embodiment, based on configuration of the application 330 as a foreground process, the application 330 may call an API from the framework 335 and transfer the first configuration value to the surfaceflinger 340 via the API.

In operation 420, the surfaceflinger 340 may transfer the first configuration value to the display 320 and the scheduler 360. Accordingly, in operation 423, the display 320 may refresh a screen according to a frame rate corresponding to the first configuration value. In operation 425, the scheduler 360 may configure the measurement period of the processor 399 as a first period (e.g., 4 ms designated for 120 Hz when the first configuration value is 120 Hz) designated for the first configuration value.

In operation 430, the surfaceflinger 340 may request a surface from the application 330 every first request period (e.g., 1/the first configuration value) corresponding to the first configuration value, based on the configuration of the frame rate of the display 320 as the first configuration value. In operation 435, the application 330 may generate a surface every first request period and provide same to the surfaceflinger 340. The first request period may also be referred to as a first refresh period.

In operation 440, the surfaceflinger 340 may recognize a new surface not being provided from the application 330, while requesting a surface from the application 330 every first request period. For example, the application 330 (e.g., home application) may not generate a surface, based on that a touch input has not been received from the display 320 for a designated time. Accordingly, a surface stored in the surface buffer 399 may not be updated to a new surface. As described above, while there is no interaction between a user and the application 330, the application 330 may not respond to a request of the surfaceflinger 340. As another example, the application 330 (e.g., media reproduction application) may not respond to a request of the surfaceflinger 340 when there is no image to be reproduced. In an example, operations 430 and 435 may be omitted, with the method then including the surfaceflinger 340 identifying that a surface is not provided from the application 330 in response to a request(s) for the surface from the surfaceflinger 340, such as may be sent based on the first request period.

In operation 441, the surfaceflinger 350 may transfer a second configuration value (e.g., about 24 Hz as a minimum value) to the display 320 and the scheduler 360, based on the recognition in operation 440. Accordingly, in operation 443, the display 320 may refresh a screen according to a frame rate corresponding to the second configuration value. In operation 445, the scheduler 360 may configure the measurement period of the processor 399 as a second period (e.g., 16 ms designated for 24 Hz) designated for the second configuration value.

In operation 450, the surfaceflinger 340 may request a surface from the application 330 every second request period (e.g., 1/the second configuration value) corresponding to the second configuration value, based on the configuration of the frame rate of the display 320 as the second configuration value (or, more generally, based on the frame rate of the display 320). The application 330 may generate a surface every second request period, or may have generated a new surface by the time the request according to the second request period is received, and provide the same to the surfaceflinger 340. Alternatively, the application 300 may not respond to a surface request of the surfaceflinger 340 when there is no surface to be provided as described above.

In operation 460, the scheduler 360 may receive a notification message indicating that a particular event has occurred, from the particular event-monitoring module 350. The scheduler 360 may change the measurement period of the processor 399 from the second period to the first period, based on the reception of the notification message while the frame rate is configured as the second configuration value.

Figure 5:
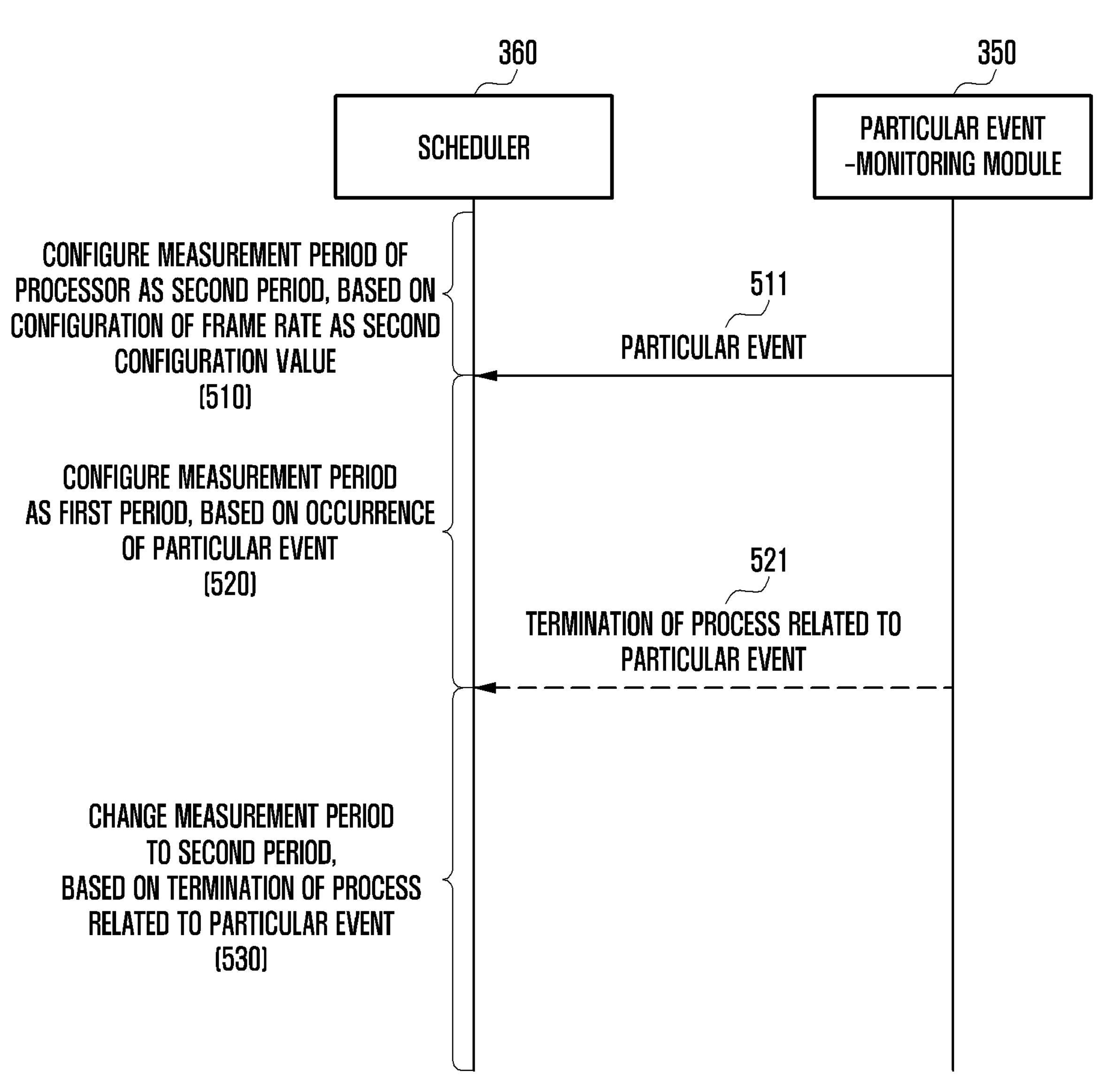
FIG. 5 is a flowchart illustrating operations for configuring a measurement period of a processor according to an embodiment.

FIG. 5 is a flowchart illustrating operations for configuring a measurement period of the processor 399 according to an embodiment.

In operation 510, the scheduler 360 may configure the measurement period of the processor 399 as a second period, based on configuration of a frame rate as a second configuration value. The second configuration value may be a minimum value (e.g., 24 Hz) in a range configurable as the frame rate. The second period may be a value (e.g., 16 ms) designated for the second configuration value. In operation 511, the scheduler 360 may recognize (e.g., detect, identify, determine etc.) occurrence of a particular event by means of the particular event-monitoring module 350. The particular event may be one or more of a CPU heavy hint, a top-app heavy hint, an I/O heavy hint, and a network heavy hint described above.

In operation 520, the scheduler 360 may configure the measurement period as a first period (e.g., 4 ms which is shorter than the second period), based on the recognition in operation 511. The first period is designated for a first configuration value, but, when a particular event occurs, may be configured as the measurement period of the processor 399 regardless of the designation. The first configuration value may be a maximum value (e.g., 120 Hz) in a range configurable as the frame rate. In operation 521, the scheduler 360 may recognize that a process related to the particular event causing the measurement period of the processor 399 to be the first period has been terminated.

In operation 530, the scheduler 360 may change the measurement period to the second period, based on the recognition in operation 521. It will be understood that, according to various embodiments, one or more operations disclosed in FIG. 5 may be omitted or may be re-arranged, where appropriate. For example, in an embodiment, a method may start with operation 521 in which the scheduler 350 detects that termination of a process related to a particular event causing the measurement period of the processor 399 to be the first period; in response to said detection, according to operation 530 the scheduler 360 changes the measurement period to a second period (e.g., 16 ms) longer than the first period, where the second period may be associated with a second configuration value of a frame rate.

Figure 6:
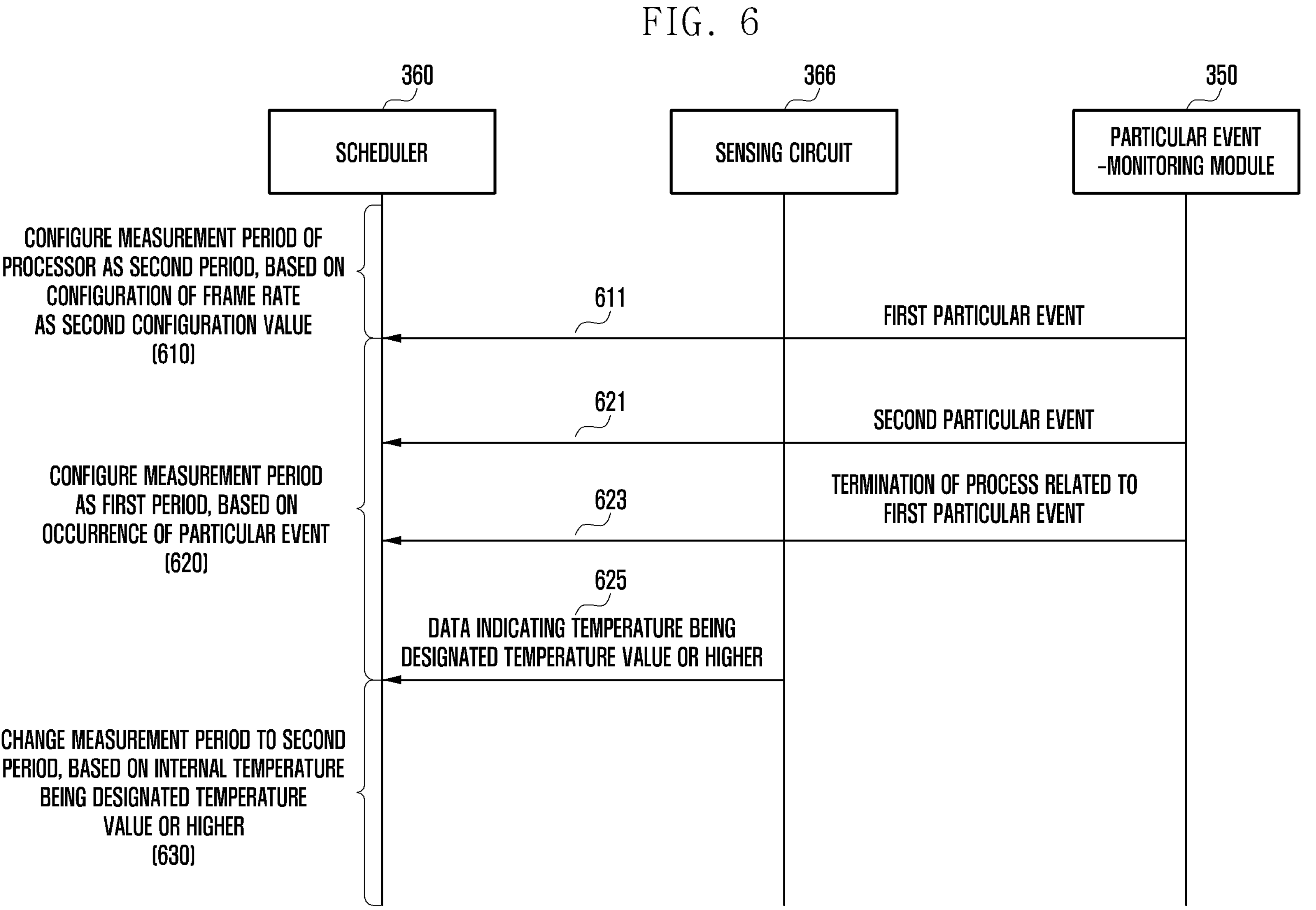
FIG. 6 is a flowchart illustrating operations for configuring a measurement period of a processor according to an embodiment.

FIG. 6 is a flowchart illustrating operations for configuring a measurement period of the processor 399 according to an embodiment. In describing FIG. 6, content overlapping with FIG. 5 will be omitted or be briefly described.

In operation 610, the scheduler 360 may configure the measurement period of the processor 399 as a second period, based on configuration of a frame rate as a second configuration value. In operation 611, the scheduler 360 may recognize occurrence of a first particular event by means of the particular event-monitoring module 350. The first particular event may be one of a CPU heavy hint, a top-app heavy hint, an I/O heavy hint, and a network heavy hint described above.

In operation 620, the scheduler 360 may configure the measurement period as a first period, based on the recognition in operation 611. In operation 621, the scheduler 360 may recognize occurrence of a second particular event by means of the particular event-monitoring module 350 while the measurement period is configured as the first period. The second particular event may be another one of a CPU heavy hint, a top-app heavy hint, an I/O heavy hint, and a network heavy hint described above. After the occurrence of the second particular event, in operation 623, the scheduler 360 may recognize termination of a process related to the first particular event by means of the particular event-monitoring module 350. Even if the first particular event is terminated, when termination of a process related to the second particular event has not been notified by the particular event-monitoring module 350, the scheduler 360 may maintain the measurement period at the first period. While the measurement period is maintained at the first period, in operation 625, the scheduler 360 may receive data indicating an internal temperature being a designated temperature value or higher, via the sensing circuit 366.

In operation 630, the scheduler 360 may change the measurement period to the second period, based on the internal temperature being the designated temperature value or higher, even when the process related to the second particular event has not been terminated. In other words, the measurement period is conditionally maintained at the first period while a process related to a particular event (which, for example, may be a CPI heavy hint, a top-app heavy hint, an I/O heavy hint or a network heavy hint etc.) is ongoing, or has not been terminated. However, detection that the internal temperature is greater than or equal to a threshold temperature value results in the measurement period being increased (e.g., changed to the second period), even if the process related to the second particular event has not been terminated.

It will be understood that, according to various embodiments, one or more operations disclosed in FIG. 6 may be omitted or may be re-arranged, where appropriate. For example, in an embodiment: a method may start with operation 623 in which the scheduler 350 detects the termination of a process related to a first particular event, yet maintains the measurement period at a first period in view of not having received an indication of the termination of a process related to a second particular event; while the measurement period is set to the first period, the scheduler 360 receives data indicating an internal temperature being a designated temperature value or higher; and, in response, the measurement period is increased (e.g. changes to the second period).

Figure 7:
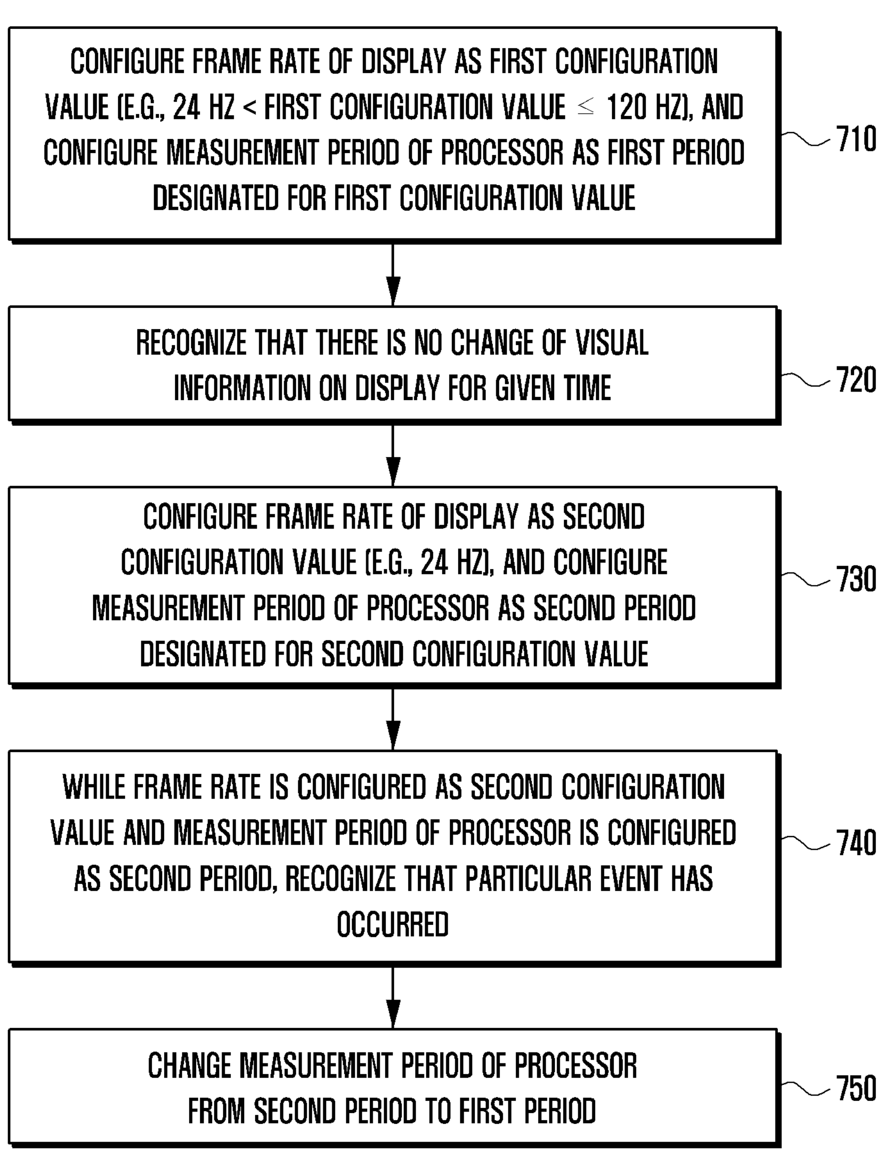
FIG. 7 is a flowchart illustrating operations of a processor for configuring a frame rate of a display and a measurement period of the processor according to an embodiment.

FIG. 7 is a flowchart illustrating operations of the processor 399 for configuring a frame rate of the display 320 and a measurement period of the processor 399 according to an embodiment.

Operations of FIG. 7 may be executed by the processor 399 when the surfaceflinger 340, the particular event-monitoring module 350, and the scheduler 360 are executed. It will be understood that at least some operations of FIG. 7 may correspond to operations shown in FIG. 4, and so a corresponding description may apply to provide further examples. Further, one or more operations described in FIG. 7 may be omitted or re-ordered, where appropriate.

In operation 710, the processor 399 may configure the frame rate of the display 320 as a first configuration value (e.g., 24 Hz<the first configuration value≤120 Hz), and configure the measurement period of the processor 399 as a first period (e.g., 4 ms designated for 120 Hz when the first configuration value is 120 Hz) designated for the first configuration value.

In operation 720, the processor 399 may recognize that there is no change of visual information on the display 320 for a given time. For example, the processor 399 may identify that the surface buffer 388 or the frame buffer 325 has not been updated for a given time, and determine same as that there is no change of visual information.

In operation 730, the processor 399 may, based on the recognition in operation 720, configure the frame rate of the display 320 as a second configuration value (e.g., 24 Hz), and configure the measurement period of the processor 399 as a second period (e.g., 16 ms) designated for the second configuration value.

While the frame rate is configured as the second configuration value and the measurement period of the processor 399 is configured as the second period, in operation 740, the processor 399 may recognize that a particular event has occurred in the electronic device 300.

In operation 750, the processor 399 may, based on the recognition in operation 740, maintain the frame rate at the second configuration value, and change the measurement period of the processor 399 from the second period to the first period.

Figure 8:
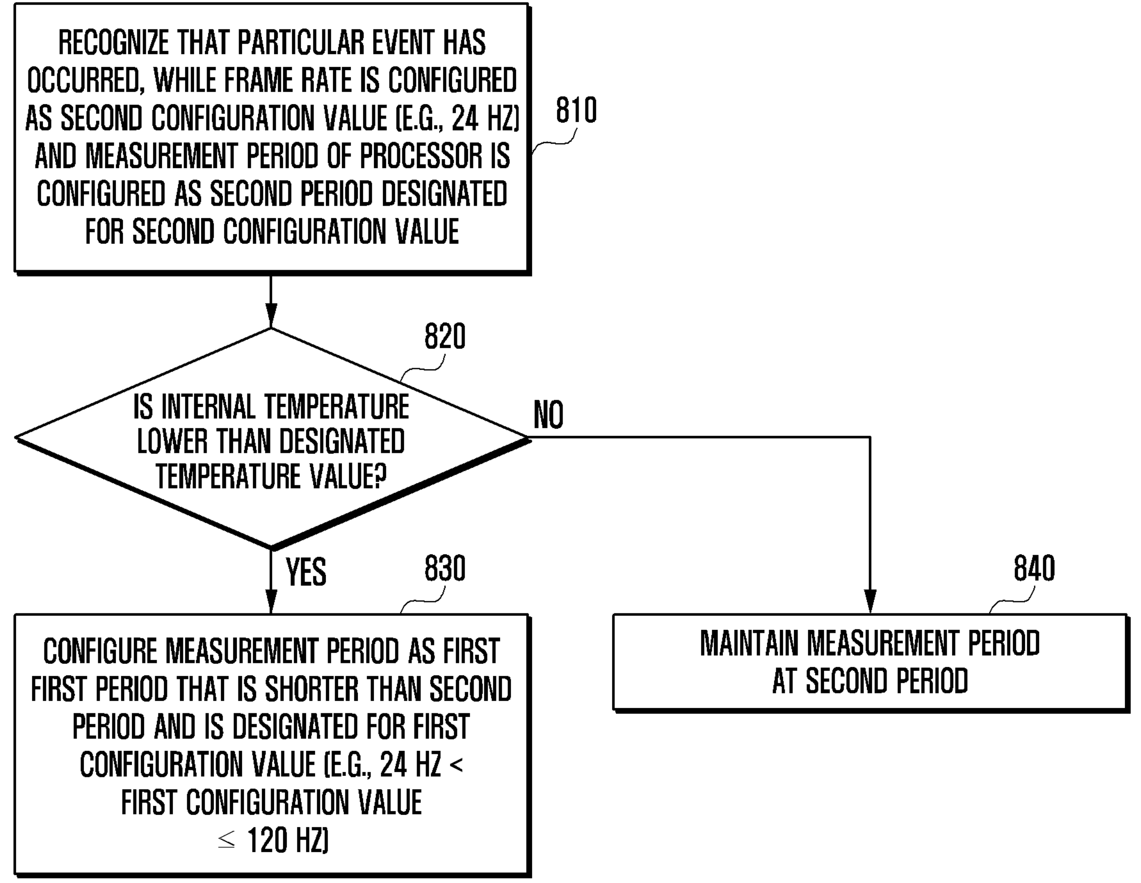
FIG. 8 is a flowchart illustrating operations of a processor for configuring a measurement period of the processor in consideration of the internal temperature of an electronic device according to an embodiment.

FIG. 8 is a flowchart illustrating operations of the processor 399 for configuring a measurement period of the processor 399 in consideration of the internal temperature of the electronic device 300 according to an embodiment. Operations of FIG. 8 may be executed by the processor 399 when the surfaceflinger 340, the particular event-monitoring module 350, and the scheduler 360 are executed.

In operation 810 (e.g., operation 460 or operation 740), the processor 399 may recognize that a particular event has occurred in the electronic device 300, while a frame rate is configured as a second configuration value (e.g., 24 Hz) and the measurement period of the processor 399 is configured as a second period (e.g., 16 ms) designated for the second configuration value.

In operation 820, the processor 399 may, based on the recognition in operation 810, identify the internal temperature of the electronic device 300 by means of the sensing circuit 366, and determine whether the internal temperature is lower than a designated temperature value.

When the identified internal temperature is lower than the designated temperature value ("Yes" in operation 820), in operation 830, the processor 399 may configure the measurement period of the processor 399 as a first period (e.g., 4 ms designated for 120 Hz) that is shorter than the second period and is designated for a first configuration value (e.g., 24 Hz<the first configuration value≤120 Hz).

When the identified internal temperature is the designated temperature value or higher ("No" in operation 820), in operation 840, the processor 399 may maintain the measurement period of the processor 399 at the second period without change. Accordingly, in an example, the measurement period is decreased or maintained based on an internal temperature of the electronic device 300 (or a specific component thereof, such as the processor 399 or memory).

Figure 9:
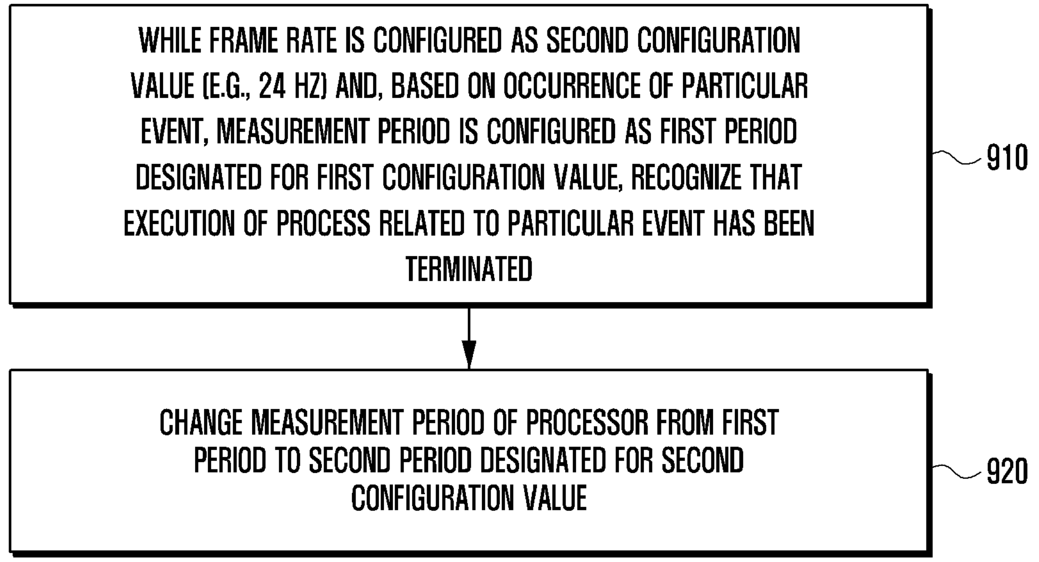
FIG. 9 is a flowchart illustrating operations of a processor for configuring a measurement period of the processor in consideration of termination of a particular event-related process according to an embodiment.

FIG. 9 is a flowchart illustrating operations of the processor 399 for configuring a measurement period of the processor 399 in consideration of termination of a particular event-related process according to an embodiment. Operations of FIG. 9 may be executed by the processor 399 when the surfaceflinger 340, the particular event-monitoring module 350, and the scheduler 360 are executed.

In operation 910, while a frame rate is configured as a second configuration value (e.g., 24 Hz) and, based on occurrence of a particular event, the measurement period of the processor 399 is configured as a first period (e.g., 4 ms designated for 120 Hz when a first configuration value is 120 Hz) designated for a first configuration value, the processor 399 may recognize that execution of a process related to the particular event has been terminated. Operation 910 may be executed after, for example, operation 750 or operation 830.

In operation 920, the processor 399 may, based on the recognition in operation 910, change the measurement period of the processor 399 from the first period to a second period (e.g., 16 ms) designated for the second configuration value.

Figure 10:
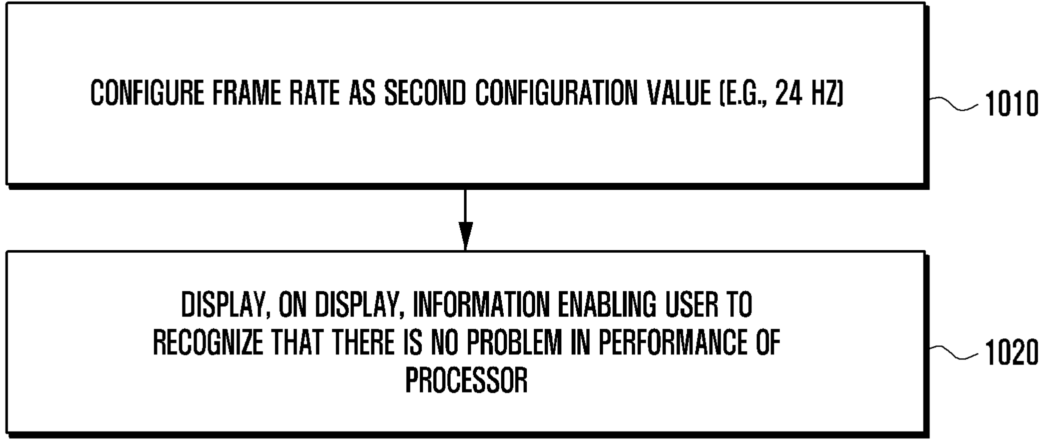
FIG. 10 is a flowchart illustrating operations of a processor for providing performance-related information to a user according to an embodiment.
Figure 11:
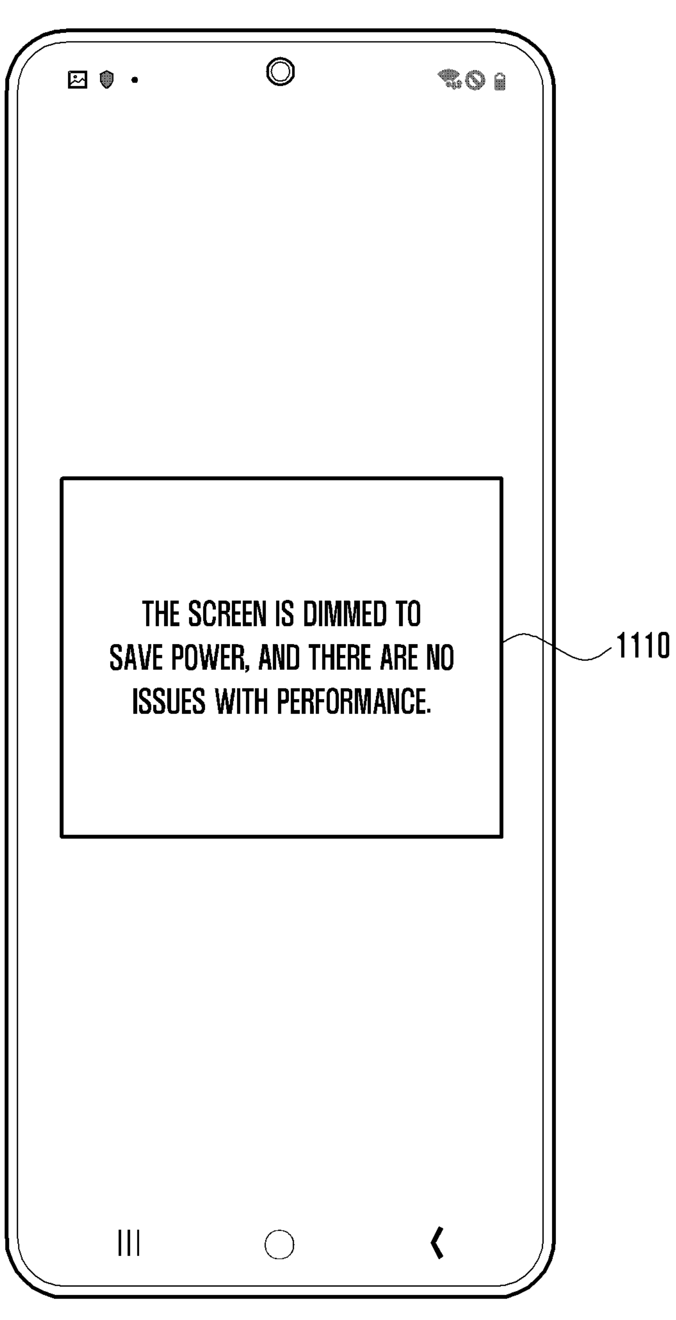
FIG. 11 is a diagram illustrating an example for a method of informing a user in relation to the performance of an electronic device.

FIG. 10 is a flowchart illustrating operations of the processor 399 for providing performance-related information to a user according to an embodiment. Operations of FIG. 10 may be executed by the processor 399 when the surfaceflinger 340, the particular event-monitoring module 350, and the scheduler 360 are executed. FIG. 11 is a diagram illustrating an example for a method of informing a user in relation to the performance of the electronic device 300.

In operation 1010 (e.g., operation 730), the processor 399 may configure a frame rate as a second configuration value. The second configuration value may be a minimum value in a range (e.g., 24-120 Hz) configurable as the frame rate. When the frame rate is configured as the second configuration value, a frame is refreshed relatively slowly and thus the screen may be seen darkly and a user may misidentify the performance of the electronic device 300 as having a problem.

In operation 1020, the processor 399 may, based on the frame rate being configured as the second configuration value, display, on the display 320, a pop-up window 1110 including information enabling the user to recognize that there is no problem in the performance of the processor 399, as illustrated in FIG. 11. It will be understood that the features of FIG. 10 and/or FIG. 11 may be combined with any other embodiment described herein, such as a time when, or following, the frame rate having been configured as the second configuration value.

Figure 12:
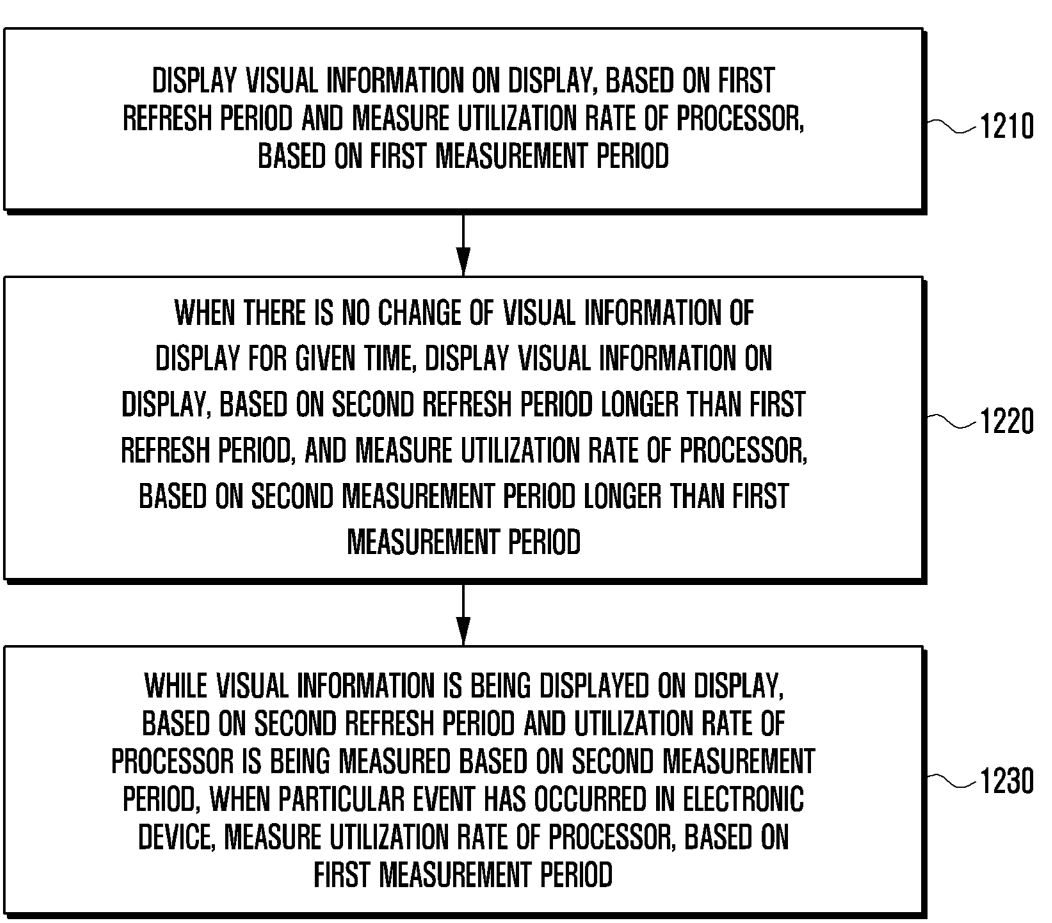
FIG. 12 is a flowchart illustrating operations of a processor for configuring a refresh period of a display and a measurement period of the processor according to an embodiment.

FIG. 12 is a flowchart illustrating operations of the processor 399 for configuring a refresh period of the display 320 and a measurement period of the processor 399 according to an embodiment. Operations of FIG. 12 may be executed by the processor 399 when the surfaceflinger 340, the particular event-monitoring module 350, and the scheduler 360 are executed.

In operation 1210, the processor 399 may display visual information on the display 320, based on a first refresh period (e.g., 1/a first configuration value), and measure the utilization rate of the processor 399, based on a first measurement period (e.g., a first period designated for the first configuration value). As described above, the first configuration value may be, or may correspond to, a frame rate. For example, a refresh period (or a request period by which a surfaceflinger requests a surface from an application) may be defined as the reciprocal of a refresh rate. The refresh rate of a display may refer to the number of times per second the display is configured to output a new image.

In operation 1220, when there is no change of the visual information of the display 320 for a given time, the processor 399 may display the visual information on the display 320, based on a second refresh period (e.g., 1/a second configuration value) longer than the first refresh period, and measure the utilization rate of the processor 399, based on a second measurement period (e.g., a second period designated for the second configuration value) longer than the first measurement period. For example, a frame rate configured for the display 320 corresponding to the second refresh period is shorter than a frame rate configured for the display 320 corresponding to the first refresh period.

In operation 1230, while the visual information is being displayed on the display based on the second refresh period and the utilization rate of the processor 399 is being measured based on the second measurement period, when a particular event has occurred in the electronic device 300, the processor 399 may measure the utilization rate of the processor 399, based on the first measurement period. For example, in response to detecting the particular event to occur, the utilization rate of the processor 399 is measured based on the first measurement period instead of based on the second measurement period. Accordingly, measurement of the utilization rate of the processor 399 is based, at least partly, on occurrence of a particular event. Various examples of a particular event are provided above, and it will be understood a particular event according to any example found herein may be that which is detected to occur in operation 1230.

According to an embodiment, an electronic device (e.g., the electronic device 300) includes a touch-sensitive display, a processor operatively connected to the display, and memory operatively connected to the processor. The memory may store instructions which, when executed by the processor, cause the electronic device to display visual information on the display, based on a first refresh period and measure a utilization rate of the processor, based on a first measurement period. The instructions may cause the processor to, in case that there is no change of the visual information of the display for a given time, display the visual information on the display, based on a second refresh period longer than the first refresh period, and measure the utilization rate of the processor, based on a second measurement period longer than the first measurement period. The instructions may cause the processor to, while the visual information is being displayed on the display, based on the second refresh period and the utilization rate of the processor is being measured based on the second measurement period, in case that a particular event related to performance of the processor has occurred in the electronic device, measure the utilization rate of the processor, based on the first measurement period.

The electronic device may further include a sensing circuit. The instructions may cause the electronic device to determine an internal temperature of the electronic device, based on data obtained from the sensing circuit. The instructions may cause the processor to, based on that the particular event has occurred and the internal temperature is lower than a designated temperature value, change a measurement period for measuring the utilization rate of the processor from the second measurement period to the first measurement period.

The instructions may cause the electronic device to, based on that the internal temperature has increased to the designated temperature value or higher in a state where the measurement period is configured as the first measurement period, change the measurement period from the first measurement period to the second measurement period.

The instructions may cause the electronic device to, based on termination of a process related to the particular event, change the measurement period from the first measurement period to the second measurement period.

The processor may include multiple CPUs. The instructions may cause the processor to monitor a utilization rate of all the CPUs. The instructions may cause the electronic device to recognize, as the particular event, a monitored case in which the utilization rate of all the CPUs has a value larger than or equal to a designated threshold and a time for which the utilization rate is maintained to have a value larger than or equal to the threshold is longer than or equal to a designated threshold time.

The instructions may cause the electronic device to monitor a utilization rate of the processor on main threads designated as a subject required to be preferentially executed among threads of a foreground process.

The instructions may cause the electronic device to recognize, as the particular event, a monitored case in which the utilization rate of the processor on the main threads has a value larger than or equal to a designated threshold and a time for which the utilization rate is maintained to have a value larger than or equal to the threshold is longer than or equal to a designated threshold time.

The instructions may cause the electronic device to monitor the number of secondary threads other than main threads designated as a subject required to be preferentially executed among threads of a foreground process. The instructions may cause the processor to recognize, as the particular event, a monitored case in which a utilization rate of the processor against the number of the secondary threads is longer than or equal to a designated threshold value.

The instructions may cause the electronic device to monitor a waiting time for which the processor is waiting to input data to the memory or output data from the memory while executing a process. The instructions may cause the processor to recognize, as the particular event, a monitored case in which the waiting time is longer than or equal to a designated threshold time.

The electronic device may further include a wireless communication circuit. The instructions may cause the electronic device to monitor an amount of data packets per unit time transmitted or received to or from outside of the electronic device via the wireless communication circuit. The instructions may cause the processor to recognize, as the particular event, a monitored case in which the amount of the packets has a value larger than or equal to a designated threshold and a time for which the amount is maintained to have a value larger than or equal to the threshold is longer than or equal to a designated threshold time.

The instructions may cause the electronic device to, based on that a refresh period of the display is configured as the second configuration value, display, on the display, information enabling a user to recognize that there is no problem in the performance of the processor.

The instructions may cause the electronic device to designate a minimum value (e.g., 24 Hz) in a range configurable as a frame rate of the display, as a value of 1/the second refresh period.

The memory may include a surface buffer configured to store a surface generated in an application. The instructions may cause the electronic device to determine that the surface buffer has not been updated for a given time, as that there is no change of the visual information of the display for the given time.

The display may include a frame buffer configured to store a frame to be displayed. The instructions may cause the electronic device to determine that the frame buffer has not been updated for a given time, as that there is no change of the visual information of the display for the given time.

A method of operating an electronic device (e.g., the electronic device 300) according to an embodiment may include displaying visual information on a display of the electronic device, based on a first refresh period and measuring a utilization rate of a processor in the electronic device, based on a first measurement period. The method may include, in case that there is no change of the visual information of the display for a given time, displaying the visual information on the display, based on a second refresh period longer than the first refresh period, and measuring the utilization rate of the processor, based on a second measurement period longer than the first measurement period. The method may include, while the visual information is being displayed on the display, based on the second refresh period and the utilization rate of the processor is being measured based on the second measurement period, in case that a particular event related to performance of the processor has occurred in the electronic device, measuring the utilization rate of the processor, based on the first measurement period.

According to an embodiment, a recording medium for storing instructions readable by a processor of an electronic device (e.g., the electronic device 300) is provided. When executed by the processor, the instructions may cause the electronic device to display visual information on a display of the electronic device, based on a first refresh period and measure a utilization rate of the processor, based on a first measurement period. The instructions may cause the processor to, in case that there is no change of the visual information of the display for a given time, display the visual information on the display, based on a second refresh period longer than the first refresh period, and measure the utilization rate of the processor, based on a second measurement period longer than the first measurement period. The instructions may cause the processor to, while the visual information is being displayed on the display, based on the second refresh period and the utilization rate of the processor is being measured based on the second measurement period, in case that a particular event related to performance of the processor has occurred in the electronic device, measure the utilization rate of the processor, based on the first measurement period.

It will be appreciated that various examples of the present disclosure provide the following subject-matters:

Subject-matter 1: An electronic device comprises a touch-sensitive display; a processor operatively connected to the display; and memory operatively connected to the processor, wherein the memory stores instructions which, when executed by the processor, cause the electronic device to: display visual information on the display and measure, based on a second measurement period, a utilization rate of the processor; while visual information is being displayed on the display and the utilization rate of the processor is being measured based on the second measurement period, identify that a particular event related to performance of the processor has occurred; and based on identifying the particular event has occurred, change a measurement period for measuring the utilization rate of the processor to a first measurement period shorter than the second measurement period; optionally, the second measurement period is set based on a second frame rate of the display (or on a second configuration value for configuring a frame rate of the display) by which the display displays visual information at the time when the measurement period is the second measurement period; optionally, the first measurement period is set based on a first frame rate of the display (or on a first configuration value for configuring a frame rate of the display) by which the display displays visual information at the time when the measurement period is the first measurement period; optionally, the first frame rate is higher than the second frame rate (or the first configuration value is greater than the second configuration value).

Subject-matter 2. The electronic device according to Subject-matter 1, further comprising a sensing circuit, wherein the instructions cause the electronic device to: determine an internal temperature of the electronic device, based on data obtained from the sensing circuit; and based on identifying the particular event has occurred and determining the internal temperature is lower than a designated temperature value, measure the utilization rate of the processor based on the first measurement period.

Subject-matter 3. The electronic device according to Subject-matter 2, wherein the instructions cause the electronic device to: based on determining that the internal temperature has increased to the designated temperature value or higher in a state where the measurement period is the first measurement period, change the measurement period from the first measurement period to the second measurement period.

Subject-matter 4. The electronic device according to any of Subject-matters 1 to 3, wherein the instructions cause the electronic device to: based on termination of a process related to the particular event, change the measurement period from the first measurement period to the second measurement period.

Subject-matter 5. The electronic device according to any of Subject-matters 1 to 4, wherein the processor comprises multiple CPUs, and wherein the instructions cause the processor to: measure, based on the second measurement period, a utilization rate of all of the CPUs; and identify, as the particular event, a case in which: a value of the utilization rate of each of the CPUs is larger than or equal to a designated threshold, and/or a time, for which the value of the utilization rate of each of the CPUs is larger than or equal to the designated threshold, is longer than or equal to a designated threshold time.

Subject-matter 6. The electronic device according to any of Subject-matters 1 to 4, wherein the instructions cause the electronic device to: measure, based on the second measurement period, a utilization rate of the processor on at least one main thread of a foreground process, the at least one main thread being designated as a subject required to be preferentially executed among threads of the foreground process; and identify, as the particular event, a case in which: the utilization rate of the processor has a value larger than or equal to a designated threshold, and/or a time for which the utilization rate has a value larger than or equal to the designated threshold is longer than or equal to a designated threshold time.

Subject-matter 7. The electronic device according to any of Subject-matters, wherein the instructions cause the electronic device to: monitor a number of secondary threads in a foreground process, the secondary thread(s) being other than at least one main thread designated as a subject required to be preferentially executed among threads of the foreground process; and identify, as the particular event, a case in which: a utilization rate of the processor in relation to the number of the secondary threads has a value larger than or equal to a designated threshold, and/or a time for which the utilization rate of the processor has a value larger than or equal to the designated threshold is longer than or equal to a designated threshold time.

Subject-matter 8. The electronic device according to any of Subject-matters 1 to 4, wherein the instructions cause the electronic device to: monitor a waiting time for which the processor is waiting to input data to the memory or output data from the memory while executing a process; and identify, as the particular event, a case in which the waiting time is longer than or equal to a designated threshold time.

Subject-matter 9. The electronic device according to any of Subject-matters 1 to 4, further comprising a wireless communication circuit, wherein the instructions cause the electronic device to: monitor an amount of data packets per unit time transmitted or received to or from outside of the electronic device via the wireless communication circuit; and identify, as the particular event, a case in which: the amount of the packets has a value larger than or equal to a designated threshold, and/or a time for which the amount of the packets has a value larger than or equal to the designated threshold is longer than or equal to a designated threshold time.

Subject-matter 10. The electronic device according to any of Subject-matters 1 to 9, wherein, while the utilization rate of the processor is being measured based on the second measurement period, a frame rate of the display is configured as a second configuration value, and while the utilization rate of the processor is being measured based on the first measurement period, the frame rate of the display is configured as a first configuration value larger than the second configuration value; and wherein the instructions cause the electronic device to: based on the frame rate of the display being configured as the second configuration value, display, on the display, information enabling a user to recognize that there is no problem in the performance of the processor.

Subject-matter 11. The electronic device according to Subject-matters 10, wherein a frame rate of the display is configurable within a range having a minimum value as a value of the second configuration value, and, optionally, wherein the minimum value is 24 Hz.

Subject-matter 12. The electronic device according to any of Subject-matters 1 to 9, wherein the memory comprises a surface buffer configured to store a surface generated in an application and wherein the instructions cause the electronic device to: display visual information on the display based on a first frame rate and measure the utilization rate of the processor based on the first measurement period; determine that the surface buffer has not been updated for a given time; and in response to determining that the surface buffer has not been updated for the given time, display visual information on the display based on a second frame rate, shorter than the first frame rate, and measure the utilization rate of the processor based on the second measurement period.

Subject-matter 13. The electronic device according to any of Subject-matters 1 to 9, wherein the display comprises a frame buffer configured to store a frame to be displayed, and wherein the instructions cause the electronic device to: display visual information on the display based on a first frame rate and measure the utilization rate of the processor based on the first measurement period; determine that the frame buffer has not been updated for a given time; and in response to determining that the frame buffer has not been updated for the given time, display visual information on the display based on a second frame rate, shorter than the first frame rate, and measure the utilization rate of the processor based on the second measurement period.

Subject-matter 14. A method of operating an electronic device, the method comprising: displaying visual information on the display and measuring, based on a second measurement period, a utilization rate of the processor; while visual information is being displayed on the display and the utilization rate of the processor is being measured based on the second measurement period, identifying that a particular event related to performance of the processor has occurred; and based on identifying the particular event has occurred, changing a measurement period for measuring the utilization rate of the processor to a first measurement period shorter than the second measurement period.

Subject-matter 15. A recording medium for storing instructions readable by a processor of an electronic device, wherein, when executed by the processor, the instructions cause the electronic device to: display visual information on the display and measure, based on a second measurement period, a utilization rate of the processor; while visual information is being displayed on the display and the utilization rate of the processor is being measured based on the second measurement period, identify that a particular event related to performance of the processor has occurred; and based on identifying the particular event has occurred, change a measurement period for measuring the utilization rate of the processor to a first measurement period shorter than the second measurement period.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a touch-sensitive display;
a processor operatively connected to the display; and
memory operatively connected to the processor,
wherein the memory stores instructions which, when executed by the processor, cause the electronic device to:
display visual information on the display and measure, based on a second measurement period, a utilization rate of the processor,
while visual information is being displayed on the display and the utilization rate of the processor is being measured based on the second measurement period, identify that a particular event related to performance of the processor has occurred, and
based on identifying that the particular event has occurred and a determination that an internal temperature is lower than a designated temperature value, change a measurement period for measuring the utilization rate of the processor to a first measurement period shorter than the second measurement period.

2. The electronic device according to claim 1, further comprising:
a sensing circuit,
wherein the instructions cause the electronic device to:
determine the internal temperature of the electronic device, based on data obtained from the sensing circuit.

3. The electronic device according to claim 2, wherein the instructions cause the electronic device to:
based on determining that the internal temperature has increased to the designated temperature value or higher in a state where the measurement period is the first measurement period, change the measurement period from the first measurement period to the second measurement period.

4. The electronic device according to claim 1, wherein the instructions cause the electronic device to,
based on termination of a process related to the particular event, change the measurement period from the first measurement period to the second measurement period.

5. The electronic device according to claim 1,
wherein the processor comprises multiple CPUs, and
wherein the instructions cause the electronic device to:
measure, based on the second measurement period, a utilization rate of all of the CPUs, and
identify, as the particular event, a case in which:
a value of the utilization rate of each of the CPUs is larger than or equal to a designated threshold, and/or
a time, for which the value of the utilization rate of each of the CPUs is larger than or equal to the designated threshold, is longer than or equal to a designated threshold time.

6. The electronic device according to claim 1, wherein the instructions cause the electronic device to:
measure, based on the second measurement period, a utilization rate of the processor on at least one main thread of a foreground process, the at least one main thread being designated as a subject required to be preferentially executed among threads of the foreground process; and
identify, as the particular event, a case in which:
the utilization rate of the processor has a value larger than or equal to a designated threshold, and/or
a time for which the utilization rate has a value larger than or equal to the designated threshold is longer than or equal to a designated threshold time.

7. The electronic device according to claim 1, wherein the instructions cause the electronic device to:
monitor a number of secondary threads in a foreground process, the secondary threads being other than at least one main thread designated as a subject required to be preferentially executed among threads of the foreground process; and
identify, as the particular event, a case in which:
a utilization rate of the processor in relation to the number of the secondary threads has a value larger than or equal to a designated threshold, and/or
a time for which the utilization rate of the processor has a value larger than or equal to the designated threshold is longer than or equal to a designated threshold time.

8. The electronic device according to claim 1, wherein the instructions cause the electronic device to:
monitor a waiting time for which the processor is waiting to input data to the memory or output data from the memory while executing a process; and
identify, as the particular event, a case in which the waiting time is longer than or equal to a designated threshold time.

9. The electronic device according to claim 1, further comprising:
a wireless communication circuit,
wherein the instructions cause the electronic device to:
monitor an amount of data packets per unit time transmitted or received to or from outside of the electronic device via the wireless communication circuit, and
identify, as the particular event, a case in which:
the amount of the packets has a value larger than or equal to a designated threshold, and/or
a time for which the amount of the packets has a value larger than or equal to the designated threshold is longer than or equal to a designated threshold time.

10. The electronic device according to claim 1,
wherein, while the utilization rate of the processor is being measured based on the second measurement period, a frame rate of the display is configured as a second configuration value, and while the utilization rate of the processor is being measured based on the first measurement period, the frame rate of the display is configured as a first configuration value larger than the second configuration value, and
wherein the instructions cause the electronic device to:
based on the frame rate of the display being configured as the second configuration value, display, on the display, information enabling a user to recognize that there is no problem in the performance of the processor.

11. The electronic device according to claim 10, wherein the frame rate of the display is configurable within a range having a minimum value of 24 Hz.

12. The electronic device according to claim 1, wherein the memory comprises a surface buffer configured to store a surface generated in an application, and wherein the instructions cause the electronic device to:

display visual information on the display based on a first frame rate and measure the utilization rate of the processor based on the first measurement period, determine that the surface buffer has not been updated for a given time, and in response to determining that the surface buffer has not been updated for the given time, display visual information on the display based on a second frame rate, shorter than the first frame rate, and measure the utilization rate of the processor based on the second measurement period.

13. The electronic device according to claim 1, wherein the display comprises a frame buffer configured to store a frame to be displayed, and wherein the instructions cause the electronic device to:

display visual information on the display based on a first frame rate and measure the utilization rate of the processor based on the first measurement period, determine that the frame buffer has not been updated for a given time, and in response to determining that the frame buffer has not been updated for the given time, display visual information on the display based on a second frame rate, shorter than the first frame rate, and measure the utilization rate of the processor based on the second measurement period.

14. A method of operating an electronic device, the method comprising:

displaying visual information on a display and measuring, based on a second measurement period, a utilization rate of a processor;

while visual information is being displayed on the display and the utilization rate of the processor is being measured based on the second measurement period, identifying that a particular event related to performance of the processor has occurred; and based on identifying that the particular event has occurred and a determination that an internal temperature is lower than a designated temperature value, changing a measurement period for measuring the utilization rate of the processor to a first measurement period shorter than the second measurement period.

15. A non-transitory recording medium storing instructions readable by a processor of an electronic device that, when executed by the processor, cause the electronic device to:

display visual information on a display and measure, based on a second measurement period, a utilization rate of the processor;

while visual information is being displayed on the display and the utilization rate of the processor is being measured based on the second measurement period, identify that a particular event related to performance of the processor has occurred; and based on identifying that the particular event has occurred and a determination that an internal temperature is lower than a designated temperature value, change a measurement period for measuring the utilization rate of the processor to a first measurement period shorter than the second measurement period.

16. The electronic device according to claim 1, wherein a frame rate of the display and the measurement period have a positive correlation.

17. The electronic device according to claim 1, wherein a frame rate of the display and the measurement period have a negative correlation.

* * * * *